United States Patent
Kimura

(10) Patent No.: US 8,023,811 B2
(45) Date of Patent: *Sep. 20, 2011

(54) IMAGE CAPTURING APPARATUS, CONTROL METHOD THEREOF, IMAGE PROCESSING APPARATUS, IMAGE PROCESSING METHOD, IMAGE CAPTURING SYSTEM, AND PROGRAM

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,808

(22) Filed: Jun. 24, 2010

(65) Prior Publication Data

US 2010/0253794 A1    Oct. 7, 2010

Related U.S. Application Data

(63) Continuation of application No. 11/757,556, filed on Jun. 4, 2007, now Pat. No. 7,769,282.

(30) Foreign Application Priority Data

Jun. 5, 2006  (JP) .................................. 2006-156646

(51) Int. Cl.
*G03B 17/00* (2006.01)
*H04N 5/228* (2006.01)

(52) U.S. Cl. ..................................... 396/55; 348/208.12
(58) Field of Classification Search ................... 396/52, 396/54, 55; 348/208.4, 208.11, 208.12, 251
See application file for complete search history.

(56) References Cited

U.S. PATENT DOCUMENTS

| 2003/0174902 A1* | 9/2003 | Barkan | 382/274 |
| 2004/0041936 A1* | 3/2004 | Uchiyama | 348/335 |

FOREIGN PATENT DOCUMENTS

| JP | 2001-086411 A | 3/2001 |
| JP | 2005-072629 A | 3/2005 |

* cited by examiner

*Primary Examiner* — Clayton E Laballe
*Assistant Examiner* — Minh Phan
(74) *Attorney, Agent, or Firm* — Cowan, Liebowitz & Latman, P.C.

(57) ABSTRACT

An image capturing apparatus includes an image capturing element which photoelectrically converts an object image formed by an image capturing optical system, a camera shake correction lens which moves the object image relative to the image capturing element, a camera shake detection sensor which detects a camera shake, a driving unit which drives the camera shake correction lens on the basis of the output from the camera shake detection sensor and a predetermined offset amount that changes in every image capturing, and a control unit which acquires a plurality of object images.

16 Claims, 17 Drawing Sheets

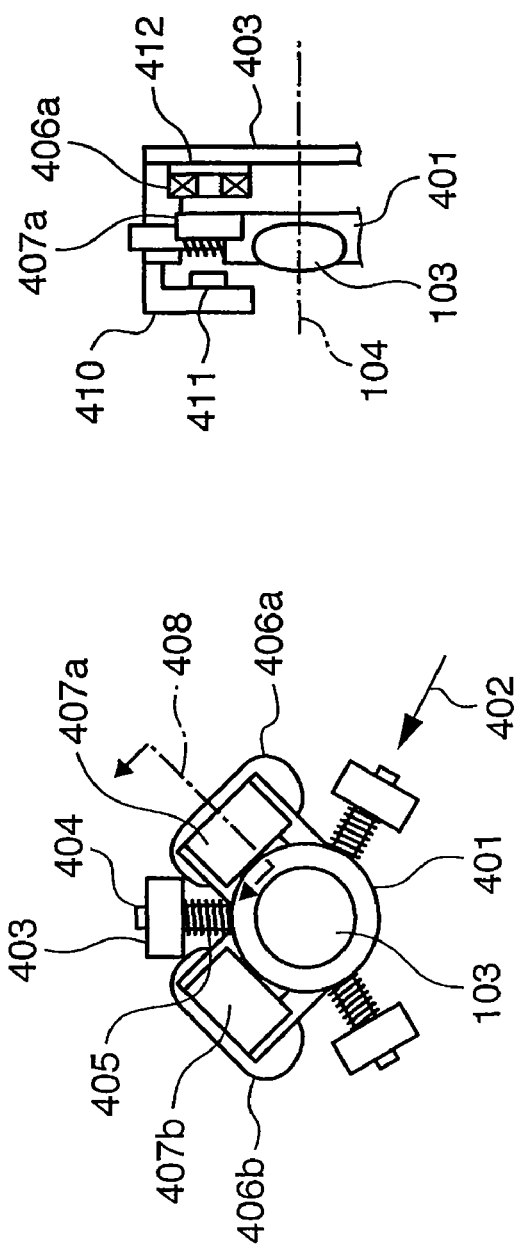

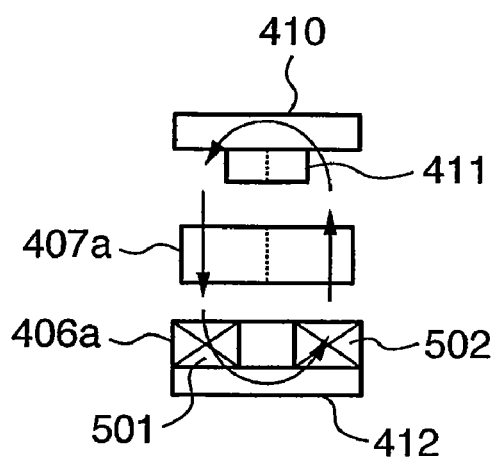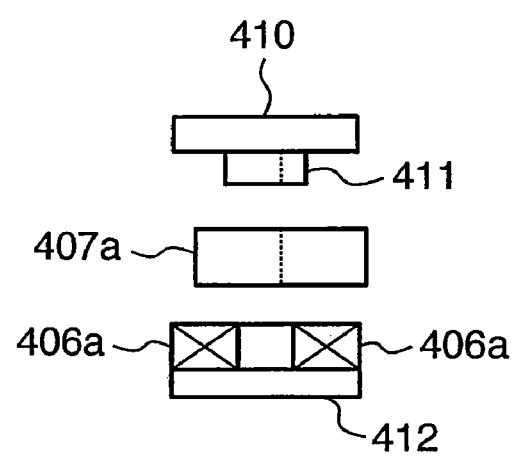
F I G. 6A        F I G. 6B

IMAGE CAPTURING APPARATUS, CONTROL METHOD THEREOF, IMAGE PROCESSING APPARATUS, IMAGE PROCESSING METHOD, IMAGE CAPTURING SYSTEM, AND PROGRAM

CROSS-REFERENCE TO RELATED APPLICATIONS

This application is a continuation of application Ser. No. 11/757,556, filed Jun. 4, 2007 now U.S. Pat. No. 7,769,282 the entire disclosure of which is hereby incorporated by reference.

BACKGROUND OF THE INVENTION

1. Field of the Invention

The present invention relates to a technique of allowing to suppress degradation of the image quality when a captured image contains a shadow of a foreign substance adhering near an image capturing element of, e.g., a digital camera.

2. Description of the Related Art

With the recent rapid progress of digitization of cameras, so-called digital single-lens reflex cameras are especially becoming popular, which have the same optical arrangement as a conventional single-lens reflex camera and use not a film but an image capturing element for photoelectric conversion. A digital single-lens reflex camera requires neither film winding nor film exchange. For this reason, once a foreign substance such as dust enters near the image capturing element during, e.g., lens exchange, captured images continue to contain the foreign substance, resulting in degradation of the quality of a series of captured images.

Japanese Patent Laid-Open No. 2002-204379 discloses a method of removing a foreign substance in an image capturing apparatus. According to the invention disclosed in Japanese Patent Laid-Open No. 2002-204379, a user removes a foreign substance that has entered in an operation such as lens exchange by operating a dustproof element arranged near the image capturing plane instead of cleaning using, e.g., a blower, thereby obtaining a high-quality image.

Japanese Patent Laid-Open No. 2004-222231 discloses a method of correcting a luminance change caused by a foreign substance on the basis of a reference image. According to the invention disclosed in Japanese Patent Laid-Open No. 2004-222231, the apparatus captures an image of a reference object with a uniform luminance and generates a transmittance map from the luminance distribution. Then, gain correction is appropriately done for an image captured by a user to correct a transmittance change caused by a foreign substance, thereby obtaining a high-quality image.

Japanese Patent Laid-Open No. 2004-172820 discloses a method of detecting a foreign substance from a plurality of images. According to the invention disclosed in Japanese Patent Laid-Open No. 2004-172820, a user acquires a plurality of images in advance, detects, e.g., an invariable contrast part in the plurality of images, and detects a foreign substance position on the basis of the invariable part. He/she appropriately removes the foreign substance in, e.g., a cleaning mode and then performs image capturing, thereby obtaining a high-quality image.

However, the invention of Japanese Patent Laid-Open No. 2002-204379 requires adding a dustproof element, resulting in high manufacturing cost.

The invention of Japanese Patent Laid-Open No. 2004-222231 cannot appropriately correct the gain if the reference image is inadequate because of, e.g., the influence of texture so it is impossible to obtain a satisfactory image.

The invention of Japanese Patent Laid-Open No. 2004-172820 requires the user to remove a foreign substance in advance in, e.g., a cleaning mode so he/she cannot cope with a foreign substance that has entered immediately before image capturing.

SUMMARY OF THE INVENTION

The present invention has been made in consideration of the above-described problems, and has as its object to effectively suppress degradation of the image quality when a captured image contains the shadow of a foreign substance existing on an optical element near the image capturing element.

According to the first aspect of the present invention, there is provided an image capturing apparatus comprising an image capturing unit configured to photoelectrically convert an object image formed by an image capturing optical system, a moving unit configured to move the object image relative to the image capturing unit, a camera shake detection unit configured to detect a camera shake, a calculation unit configured to calculate a moving amount of the moving unit to cancel the camera shake on the basis of an output from the camera shake detection unit, a driving unit configured to drive the moving unit by adding a predetermined offset amount to the moving amount calculated by the calculation unit, and a control unit configured to acquire a plurality of captured images while changing the predetermined offset amount in every image capturing.

According to the second aspect of the present invention, there is provided an image capturing apparatus comprising an image capturing unit configured to photoelectrically convert an object image formed by an image capturing optical system, a moving unit configured to move the object image relative to the image capturing unit, a driving unit configured to drive the moving unit in accordance with an offset amount predetermined on the basis of an aperture value of the image capturing optical system, and a control unit configured to acquire a plurality of captured images while changing the predetermined offset amount in every image capturing.

According to the third aspect of the present invention, there is provided an image processing apparatus comprising an acquisition unit configured to acquire a plurality of captured images acquired in an image capturing apparatus, and an offset amount provided to a moving unit configured to move an object image relative to an image capturing unit in obtaining the plurality of captured images in the image capturing apparatus, a foreign substance detection unit configured to detect foreign substance area information including at least position information about a foreign substance adhering near the image capturing unit by comparing the plurality of captured images, an image composition unit configured to align and composite the plurality of captured images on the basis of the offset amount, and an image correction unit configured to, upon causing the image composition unit to execute composition, correct a partial area containing a shadow of the foreign substance in a first captured image as one of the plurality of captured images by using a partial area containing no shadow of the foreign substance in another captured image different from the first captured image of the plurality of captured images on the basis of the offset amount and the foreign substance area information.

According to the fourth aspect of the present invention, there is provided an image capturing system comprising an image capturing apparatus including an image capturing unit configured to photoelectrically convert an object image formed by an image capturing optical system, a moving unit configured to move the object image relative to the image capturing unit, a camera shake detection unit configured to detect a camera shake, a calculation unit configured to calculate a moving amount of the moving unit to cancel the camera shake on the basis of an output from the camera shake detection unit, a driving unit configured to drive the moving unit by adding a predetermined offset amount to the moving amount calculated by the calculation unit, and a control unit configured to acquire a plurality of captured images while changing the predetermined offset amount in every image capturing, and an image processing apparatus including an acquisition unit configured to acquire the plurality of captured images acquired in the image capturing apparatus, and an offset amount provided to the moving unit in obtaining the plurality of captured images in the image capturing apparatus, a foreign substance detection unit configured to detect foreign substance area information including at least position information about a foreign substance adhering near the image capturing unit by comparing the plurality of captured images, an image composition unit configured to align and composite the plurality of captured images on the basis of the offset amount, and an image correction unit configured to, upon causing the image composition unit to execute composition, correct a partial area containing a shadow of the foreign substance in a first captured image as one of the plurality of captured images by using a partial area containing no shadow of the foreign substance in another captured image different from the first captured image of the plurality of captured images on the basis of the offset amount and the foreign substance area information.

According to the fifth aspect of the present invention, there is provided a method of controlling an image capturing apparatus including an image capturing unit configured to photoelectrically convert an object image formed by an image capturing optical system, a moving unit configured to move the object image relative to the image capturing unit, and a camera shake detection unit configured to detect a camera shake, comprising the steps of calculating a moving amount of the moving unit to cancel the camera shake on the basis of an output from the camera shake detection unit, driving the moving unit by adding a predetermined offset amount to the calculated moving amount, and acquiring a plurality of captured images while changing the predetermined offset amount in every image capturing.

According to the sixth aspect of the present invention, there is provided a method of controlling an image capturing apparatus including an image capturing unit configured to photoelectrically convert an object image formed by an image capturing optical system, and a moving unit configured to move the object image relative to the image capturing unit, comprising the steps of driving the moving unit in accordance with an offset amount predetermined on the basis of an aperture value of the image capturing optical system, and acquiring a plurality of captured images while changing the predetermined offset amount in every image capturing.

According to the seventh aspect of the present invention, there is provided an image processing method comprising the steps of acquiring a plurality of captured images acquired in an image capturing apparatus, and an offset amount provided to a moving unit configured to move an object image relative to an image capturing unit in obtaining the plurality of captured images in the image capturing apparatus, detecting foreign substance area information including at least position information about a foreign substance adhering near the image capturing unit by comparing the plurality of captured images, correcting a partial area containing a shadow of the foreign substance in a first captured image as one of the plurality of captured images using a partial area containing no shadow of the foreign substance in another captured image different from the first captured image of the plurality of captured images on the basis of the offset amount and the foreign substance area information, and aligning and compositing the plurality of captured images on the basis of the offset amount.

According to the eighth aspect of the present invention, there is provided a program which causes a computer to execute the above-described control method or image processing method.

Further features of the present invention will become apparent from the following description of exemplary embodiments with reference to the attached drawings.

BRIEF DESCRIPTION OF THE DRAWINGS

FIGS. 5A to 5C are views showing an example of a camera shake correction mechanism according to the first embodiment;

FIGS. 6A and 6B are views showing the driving force generation unit of the camera shake correction mechanism according to the first embodiment;

DESCRIPTION OF THE EMBODIMENTS

The preferred embodiments of the present invention will be described below in detail with reference to the accompanying drawings.

First Embodiment

Figure 1:
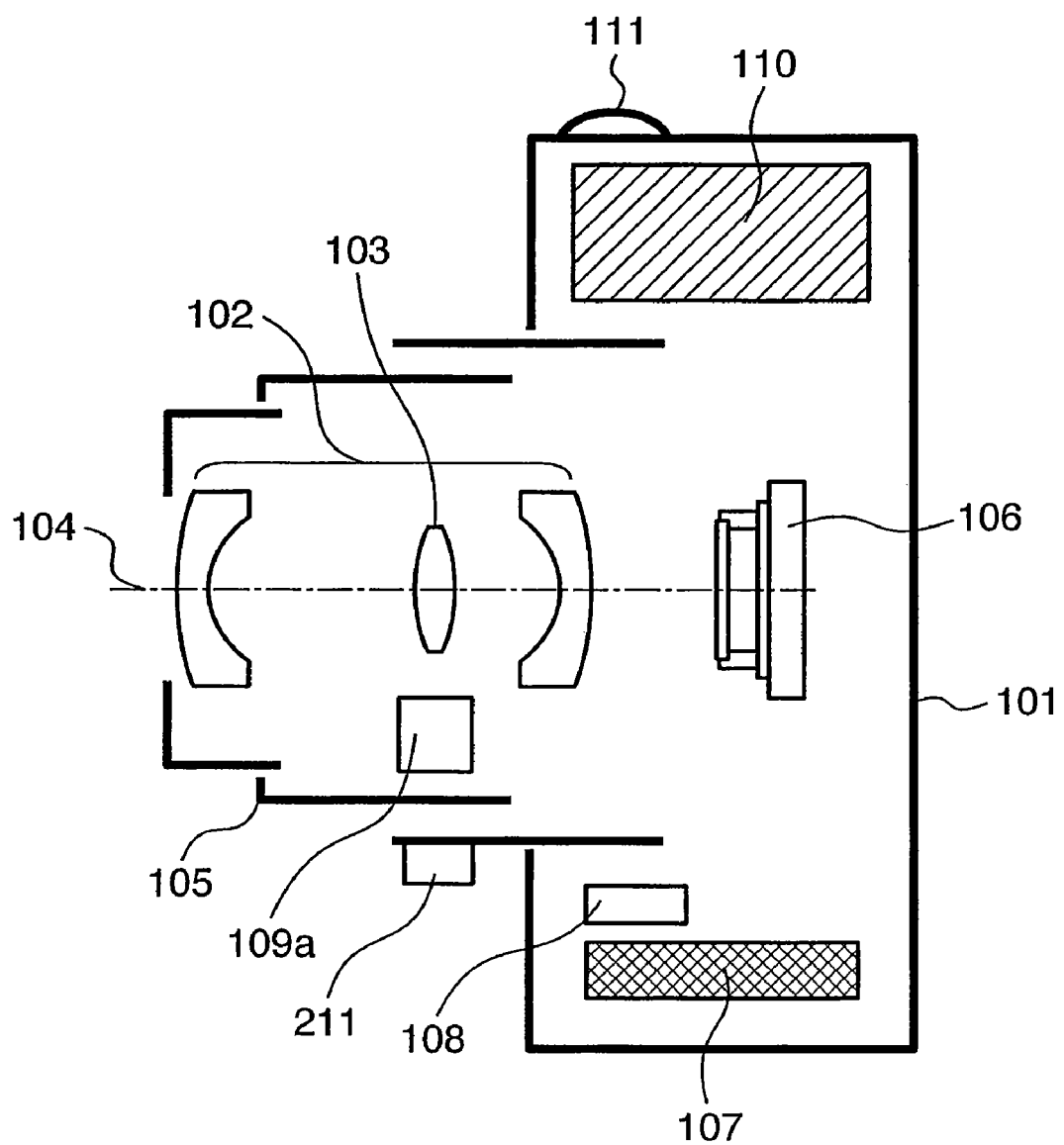
FIG. 1 is a sectional view of an image capturing apparatus according to the first embodiment.

FIG. 1 is a sectional view showing an image capturing apparatus according to the preferred first embodiment of the present invention. An image capturing apparatus 101 such as a digital camera includes an image capturing optical system 102 such as a photographing lens, a camera shake correction lens 103 arranged in the image capturing optical system 102, an optical axis 104 of the image capturing optical system, a lens barrel 105, an image capturing element 106, and a memory 107. A camera shake detection sensor 108 includes a gyro sensor for detecting a camera shake. A driving unit 109a drives the camera shake correction lens 103. The apparatus also includes a power supply 110 and a release button 111.

The image capturing apparatus 101 causes the image capturing optical system 102 and a focus adjusting unit (not shown) to form an object image near the image capturing element 106. The image capturing element 106 photoelectrically converts the object image formed by the image capturing optical system 102. The image capturing apparatus 101 acquires an image signal from the image capturing element 106 in synchronism with the user's operation of the release button 111 and records the data in the memory 107. In a camera shake correction mode, the driving unit 109a drives the camera shake correction lens 103 on the basis of a signal from the camera shake detection sensor 108 during exposure, thereby correcting an image blur by a camera shake. A switch 211 sets ON/OFF of the camera shake correction mode. The switch 211 can also set ON/OFF of foreign substance correction (to be described later).

Figure 2:
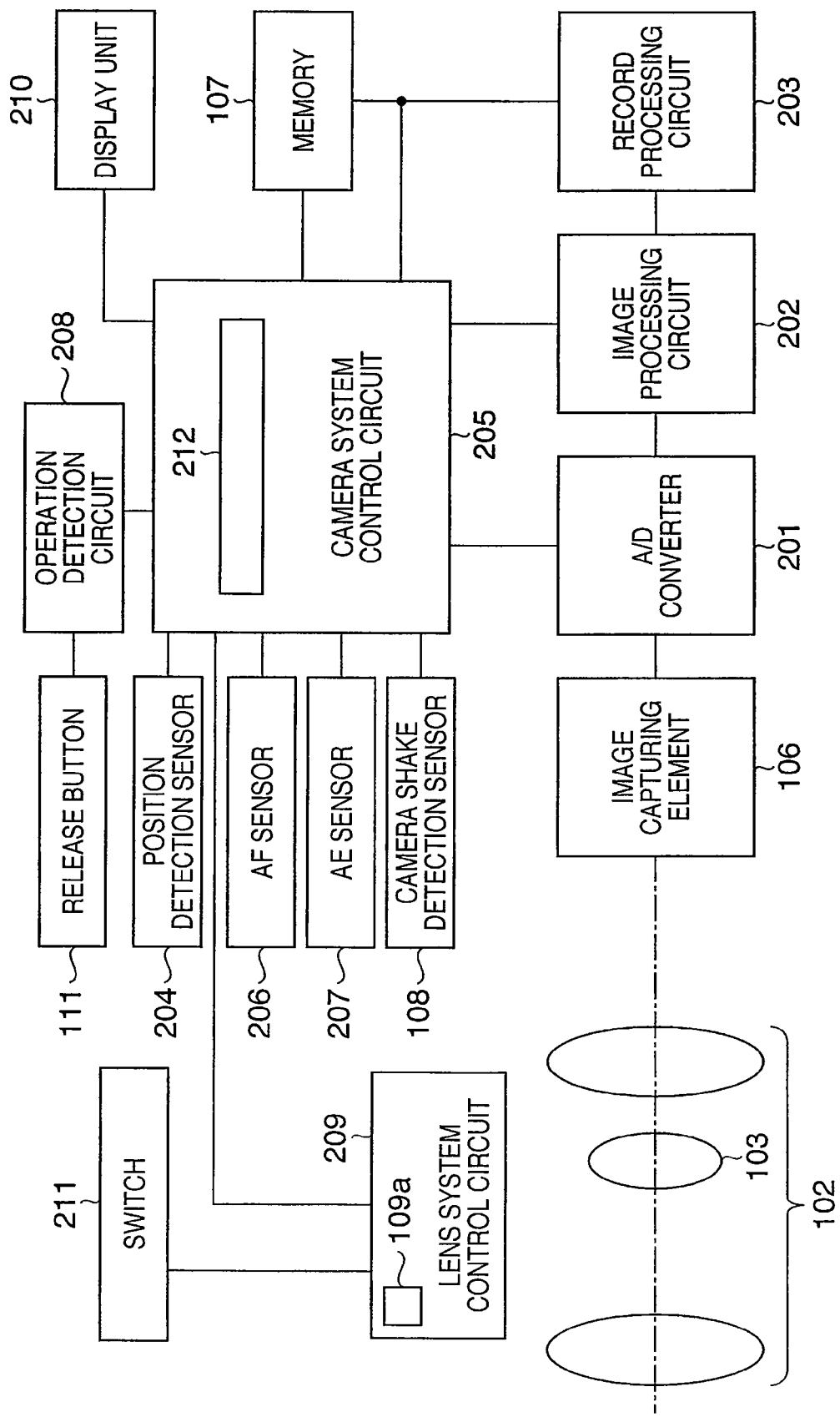
FIG. 2 is a block diagram showing the electrical arrangement of the image capturing apparatus according to the first embodiment.

FIG. 2 is a block diagram showing the electrical arrangement of the image capturing apparatus 101. The image capturing apparatus 101 includes, e.g., an image capturing system, image processing system, recording/reproduction system, and control system. The image capturing system includes, e.g., the image capturing optical system 102 and the image capturing element 106. The image processing system includes, e.g., an A/D converter 201 and an image processing circuit 202. The recording/reproduction system includes, e.g., a record processing circuit 203 and the memory 107. The control system includes, e.g., a camera system control circuit 205, an AF (Auto Focus) sensor 206, an AE (Auto Exposure) sensor 207, the camera shake detection sensor 108, an operation detection circuit 208, and a lens system control circuit 209. The control system also includes a position detection sensor 204 that detects the position of the camera shake correction lens 103. The lens system control circuit 209 includes the driving unit 109a that drives the camera shake correction lens 103.

The image capturing system is an optical processing system that forms an image of light from an object on the image capturing plane of the image capturing element 106 via the image capturing optical system 102. The image capturing system exposes the image capturing element 106 to object light with an appropriate amount via, e.g., an iris (not shown) on the basis of a signal from the AE sensor 207. The image processing circuit 202 is a signal processing circuit that processes an image signal received from the image capturing element 106 and corresponding to the number of pixels of the image capturing element 106. The image processing circuit 202 has a white balance circuit, gamma correction circuit, and interpolation operation circuit that executes an interpolation operation to increase the resolution.

The record processing circuit 203 outputs the image signal to the memory 107 and also generates and saves an image to be output to a display unit 210. The record processing circuit 203 also compresses an image or a moving image by a known method.

The control system includes the operation detection circuit 208, camera system control circuit 205, AF sensor 206, AE sensor 207, camera shake detection sensor 108, and lens system control circuit 209. The operation detection circuit 208 detects the operation of, e.g., the release button 111. The camera system control circuit 205 controls the units in response to a detection signal from the operation detection circuit 208 and generates and outputs, e.g., a timing signal for image capturing. The AF sensor 206 detects the focus state of the image capturing apparatus 101. The AE sensor 207 detects the luminance of the object. The camera shake detection sensor 108 detects camera shake. The lens system control circuit 209 appropriately controls the lens and the like in accordance with a signal from the camera system control circuit 205. The lens system control circuit 209 also causes the internal driving unit 109a to drive the camera shake correction lens 103.

The control system controls the image capturing system, image processing system, and recording/reproduction system in response to an external operation. For example, upon detecting press of the release button 111, the control system controls driving of the image capturing element 106, the operation of the image processing circuit 202, and the compression process of the record processing circuit 203. The control system also controls the state of each segment of an information display device which displays information on an optical viewfinder or a liquid crystal monitor via the display unit 210.

The AF sensor 206 and AE sensor 207 connect to the camera system control circuit 205. The camera system control circuit 205 appropriately controls the iris on the basis of signals from these sensors. The camera shake detection sensor 108 also connects to the camera system control circuit 205. When the switch 211 sets the camera shake correction mode, the driving unit 109a drives the camera shake correction lens 103 on the basis of a signal from the camera shake detection sensor 108 and a calculation result from a calculation unit 212. The switch 211 notifies the camera system control circuit 205 of its setting via the lens system control circuit 209.

The camera shake correction system will be described next in detail with reference to FIGS. 3 to 5C. The control block of the camera shake correction system has the arrangement shown in FIG. 3. A camera shake signal detected by the camera shake detection sensor 108 passes through a high-pass filter (HPF) 302 that passes a signal with a predetermined frequency or more. Then, an integrator 303 converts the camera shake signal into a shake amount. The calculation unit 212 adds, to the converted shake amount, a detection signal from the position detection sensor 204 that detects the position of the camera shake correction lens 103, thereby generating a first moving target amount 300a.

A normal camera shake correction control system controls the driving unit 109a on the basis of the first moving target amount 300a, and makes it drive the camera shake correction lens 103 to cancel the user's camera shake. In this embodiment, the control system further reads out an offset amount 301 from the memory 107 and adds it to the first moving target amount 300a, thereby generating a second moving target amount 300b. The system controls the driving unit 109a on the basis of the second moving target amount 300b, and makes it drive the camera shake correction lens 103. The offset amount is a predetermined amount that changes upon capturing every image. The first moving target amount changes incessantly even during capturing of one image (during exposure of the image capturing element 106) as the user's camera shake takes place. This will be described later in detail. The high-pass filter 302 and integrator 303 exist in the camera system control circuit 205.

One system corresponding to one axis of the moving directions of the camera shake correction lens 103 has been described above. In fact, the camera shake correction lens 103 moves in a plane perpendicular to the optical axis 104. Two systems are necessary for moving the camera shake correction lens 103 along two axes in a plane. This embodiment also uses two systems.

Figure 3:
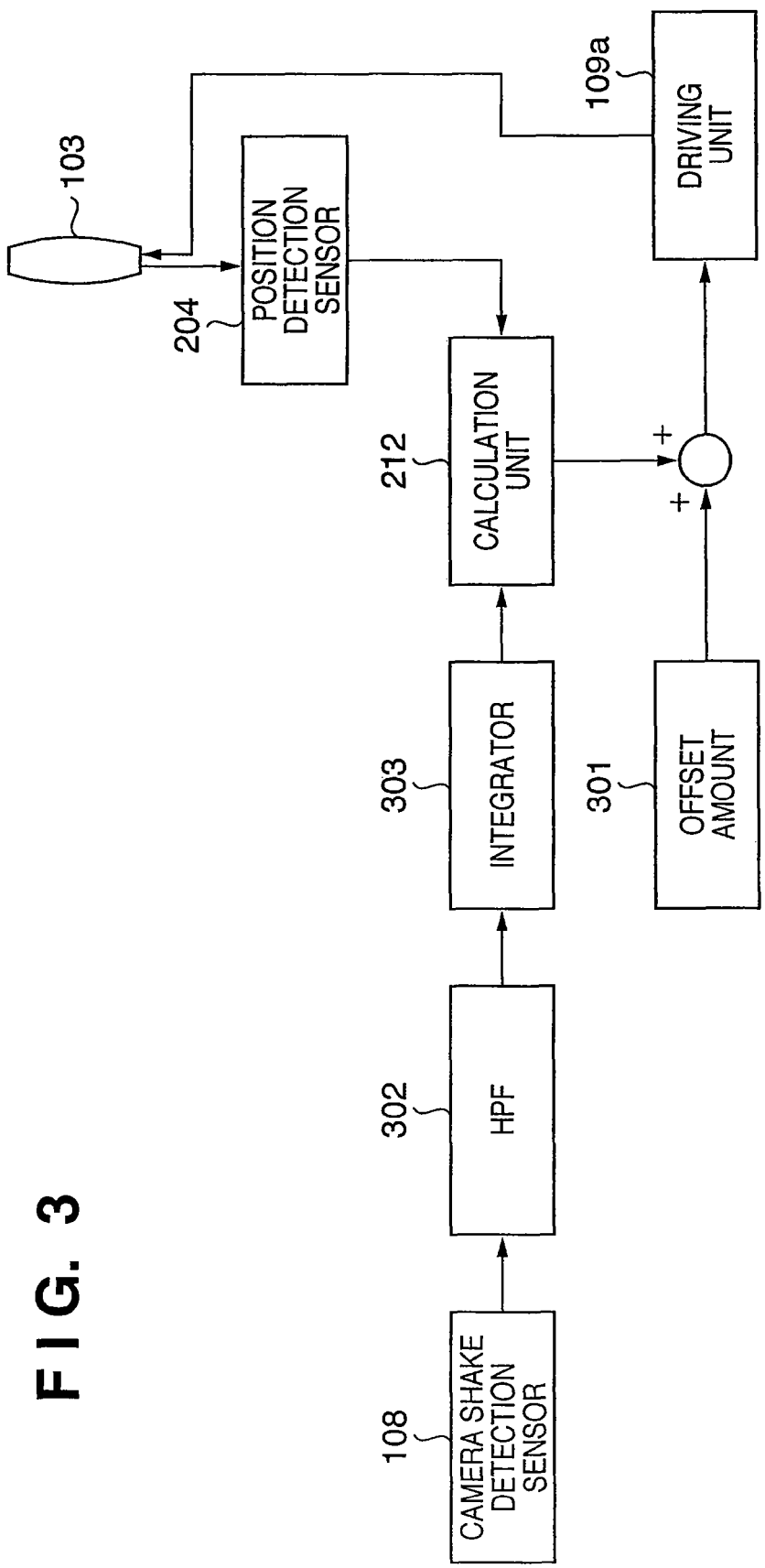
FIG. 3 is a block diagram related to driving of a camera shake correction lens 103 according to the first embodiment.
Figure 4:
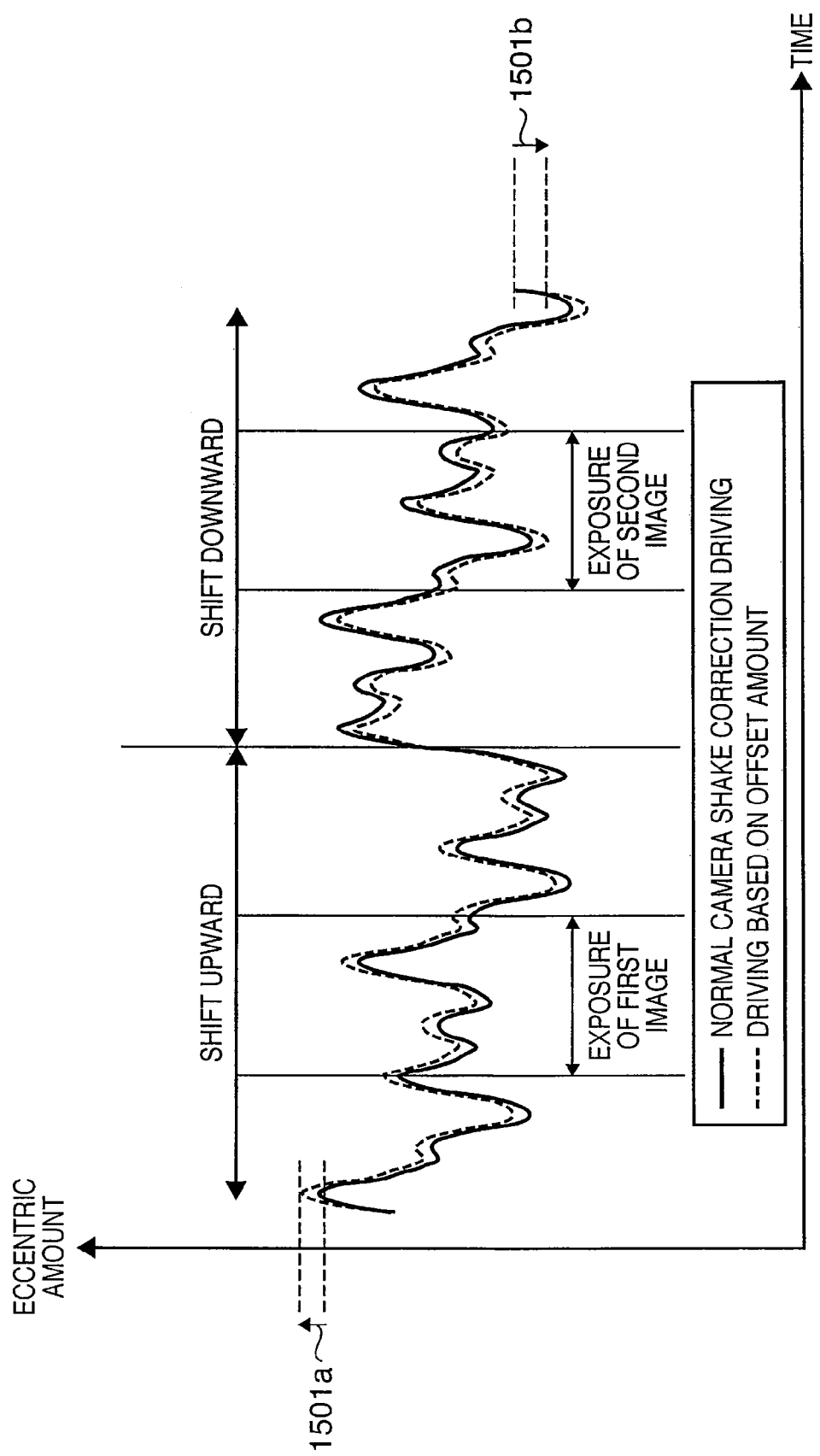
FIG. 4 is a graph for explaining the operation of the camera shake correction lens 103.

FIG. 4 is a graph for schematically explaining the operation of the camera shake correction lens 103 by the feedback control system shown in FIG. 3. The abscissa represents the elapse of time, and the ordinate represents an eccentric amount from the optical axis center. The solid line indicates a case wherein the control system drives the camera shake correction lens 103 in response to the user's camera shake such that an object forms its image on the image capturing element 106 without shaking while centering around the optical axis 104. That is, the solid line indicates driving by normal camera shake correction control, i.e., a state wherein the control system controls the driving unit 109a on the basis of the first moving target amount 300a. In this embodiment, however, the system controls the camera shake correction lens 103, as indicated by the dotted line. First, a first offset amount 1501a as the offset amount 301 is provided and added to the first moving target amount 300a to obtain the second moving target amount 300b. The system uniformly applies the offset amount throughout exposure related to capturing of the first image. The offset amount 1501a shifts the object image upward by a predetermined amount. If the system drives the camera shake correction lens 103 on the basis of the offset amount 1501a, the object forms its image on the image capturing element 106 without shaking while shifting upward from the optical axis 104 by an amount corresponding to the offset amount. Hence, the image capturing element 106 outputs a camera-shake-free image signal with an angle of view shifted upward by an amount corresponding to the offset amount 1501a.

Next, a second offset amount 1501b is provided as the offset amount 301 when capturing of the second image of the same object starts. The offset amount 1501b shifts the object image downward by a predetermined amount. The second offset amount 1501b is added to the first moving target amount 300a to obtain the second moving target amount 300b. As in capturing of the first image, the system uniformly applies the offset amount throughout exposure related to capturing of the second image. If the system drives the camera shake correction lens 103 on the basis of the offset amount 1501b, the object forms its image on the image capturing element 106 without shaking while shifting downward from the optical axis 104 by an amount corresponding to the offset amount. Hence, the image capturing element 106 outputs a camera-shake-free image signal with an angle of view shifted downward by an amount corresponding to the offset amount 1501b. The above-described process makes it possible to acquire a plurality of images with slightly different angles of view by capturing the same object continuously while correcting the camera shake and switching the offset amount 301. In the example shown in FIG. 4, the object image shifts upward and downward. Shift to the left or right or in a diagonal direction is also possible by appropriately giving the offset amount 301. If the offset amount 301 sequentially changes to shift the object image in, e.g., a diagonal-right-up, diagonal-right-down, diagonal-left-up, and diagonal-left-down directions, it is possible to acquire four image signals with slightly different angles of view in correspondence with the same object.

A mechanism for driving the camera shake correction lens 103 will be described next with reference to FIGS. 5A to 5C. FIG. 5A is a view schematically showing a mechanism to move the camera shake correction lens 103 as a partial optical system of the image capturing optical system 102.

Referring to FIG. 5A, the mechanism includes a movable frame 401 to hold a lens, the camera shake correction lens 103, fixed units 403 attached to the lens barrel, support/guide units 404 on the movable frame, springs 405 attached coaxially to the support/guide units, coils 406a and 406b attached to the fixed unit, and magnets 407a and 407b attached to the movable frame. FIG. 5B is a right side view of the camera shake correction mechanism in FIG. 5A. Referring to FIG. 5B, the mechanism includes yokes 410 and 412 (not shown in FIG. 5A), and a position detection sensor 411 (not shown in FIG. 5A) of the movable unit. More specifically, the position detection sensor 411 includes a Hall element. FIG. 5C shows the mechanism seen from the direction of an arrow 402 in FIG. 5A. The support/guide units 404 guide and support the movable frame 401 so that it can move in a plane with respect to the fixed units 403. In FIG. 5C, an elongated guide groove 413 receives the support/guide unit 404. The camera shake correction mechanism has identical structures on three points so as to restrict its movement in the direction of the optical axis 104 of the image capturing optical system 102 but to allow its movement in a plane perpendicular to the optical axis 104. The movable frame 401 has, on it, the camera shake correction lens 103 and magnets 407a and 407b for driving. The springs 405 attached coaxially to the support/guide units 404 elastically support the movable frame 401. In the absence of a driving force, the center of the camera shake correction lens 103 almost matches the optical axis 104. The driving part has the magnet 407a sandwiched by the yokes, and the coil 406a provided on one side, as shown in FIG. 5B. The principle of the driving part will be explained with reference to FIGS. 6A and 6B.

FIGS. 6A and 6B are views showing a driving circuit part taken along a dotted line 408 in FIG. 5A. The magnet 407a magnetized in the direction of thickness has two poles. The magnet 407a has the yokes 410 and 412 on both the sides of the magnetization direction so that most magnetic fluxes generate a magnetic field in the direction indicated by arrows in FIG. 6A without leaking to the outside. Energization to the coil 406a in this state flows currents with opposite directions to regions 501 and 502 on the coil 406a. Since the directions of magnetic fields are also opposite, a force in the same direction is generated by the Fleming's left hand rule. Since the coil is fixed, the magnet 407a attached to the movable unit is driven upon receiving the force by the law of action and reaction. The driving force is proportional to the current of the coil 406a. When the current flowing to the coil 406a reverses its direction, the driving force received by the magnet 407a can also reverse the direction. The generated driving force displaces the movable unit elastically supported by the spring 405 to a point where the driving force and the spring force balance. That is, it is possible to control the position of the movable unit by appropriately controlling the current of the coil 406a. The yoke 410 has the Hall element 411 on it. When the driving force generated by applying a current to the coil 406a displaces the magnet 407a, the magnetic balance on the Hall element 411 also changes, as shown in FIG. 6B. It is therefore possible to detect the position of the magnet 407a by obtaining a signal from the Hall element 411.

FIGS. 5A to 5C, 6A, and 6B illustrate an example of a moving magnet scheme with a magnet arranged on the movable unit and a coil arranged on the fixed unit. However, this embodiment is also applicable to an image capturing apparatus having a camera shake correction mechanism using a moving coil scheme with a coil arranged on the movable unit and a magnet arranged on the fixed unit, or any other driving method.

Figure 7:
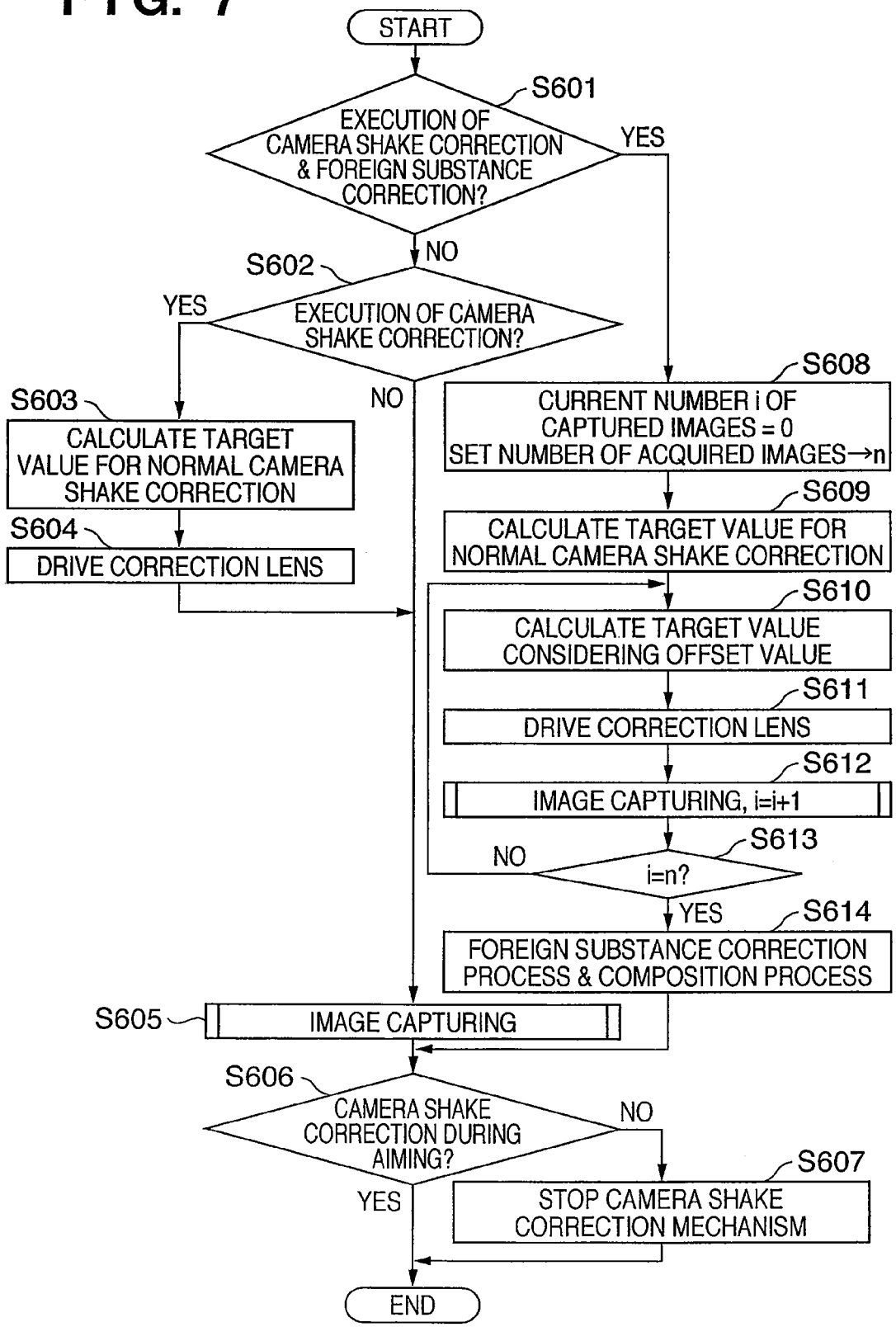
FIG. 7 is a flowchart illustrating the operation of the image capturing apparatus.

An image capturing operation according to this embodiment will be described next with reference to FIG. 7. FIG. 7 is a flowchart of an image capturing operation according to this embodiment. The image capturing operation will be described by sequentially explaining the steps shown in FIG. 7. Note that the user can set ON/OFF of execution of the operation of this embodiment.

A case wherein the camera system control circuit 205 does not execute camera shake correction and foreign substance correction ("camera shake correction & foreign substance correction" in FIG. 7) of this embodiment (NO in step S601) will be described first. To execute only normal camera shake correction (YES in step S602), a target value for normal camera shake correction, i.e., the first moving target amount 300a is calculated in step S603. The camera shake correction lens 103 is driven on the basis of the first moving target amount 300a (step S604), and the image capturing sequence is executed while correcting the camera shake (step S605).

Figure 8:
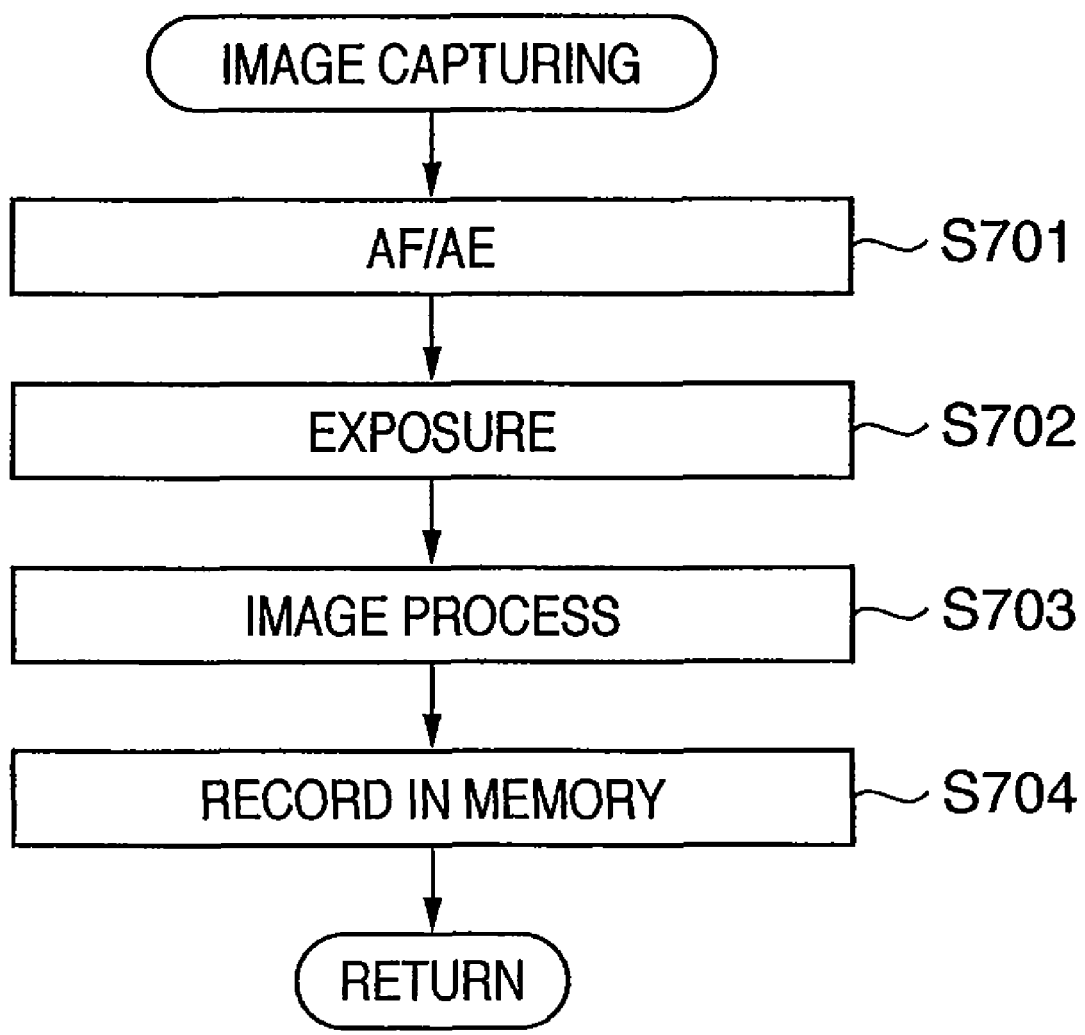
FIG. 8 is a flowchart illustrating the sequence of the image capturing apparatus.

FIG. 8 is a flowchart illustrating the detailed sequence of image capturing in step S605. Upon receiving an image capturing start signal generated by pressing the release button 111, an AF/AE operation is performed in step S701. More specifically, on the basis of signals obtained from the AF sensor 206 and AE sensor 207, the camera system control circuit 205 executes focusing, iris adjustment, and exposure time setting via the lens system control circuit and the like. In step S702, the camera system control circuit 205 exposes an object image on the image capturing element 106. The image capturing element 106 outputs a photoelectrically converted image signal. The A/D converter 201 A/D-converts the image signal into a digital signal. The image processing circuit 202 processes the signal in step S703. More specifically, the image processing circuit 202 executes image processes such as known γ-correction, white balance correction, and compression to generate an image file. In step S704, the record processing circuit 203 records the generated image file in the memory 107, thus ending the series of image capturing sequences.

Referring back to FIG. 7, when the image sequence finishes in step S605, the process advances to step S606. The user can determine the composition before image capturing while confirming the object image sequentially displayed on the display unit 210. Camera shake correction for the sequentially displayed object image is possible even during this aiming. In step S606, it is determined whether camera shake correction during aiming is set. If YES in step S606, the camera shake correction lens 103 is driven, like normal camera shake correction control. If NO in step S606, the camera shake correction lens 103 is not driven.

If the switch 211 sets to execute foreign substance correction together with camera shake correction, the process advances from step S601 to step S608. In step S608, the current number i of captured images is set to 0, and the number of acquired images is set to n (n is an integer: n≧2). In step S609, a target value for normal camera shake correction, i.e., the first moving target amount 300a is calculated. The first moving target amount 300a is updated as needed as the user's camera shake occurs until n captured images are acquired. The process advances to step S610 to read out the offset amount 301 from the memory 107 and add it to the first moving target amount 300a calculated in step S609, thereby calculating the second moving target amount 300b. The offset amount 301 is updated in accordance with the current number i of captured images. There are prepared n offset amounts 301 corresponding to the number n of acquired images. For example, assume that the number of acquired images is four. There are prepared an offset amount to shift the object image in a diagonal-right-up direction when i=1, i.e., upon capturing the first image, an offset amount to shift the object image in a diagonal-right-down direction when i=2, i.e., upon capturing the second image, an offset amount to shift the object image in a diagonal-left-up direction when i=3, i.e., upon capturing the third image, and an offset amount to shift the object image in a diagonal-left-down direction when i=4, i.e., upon capturing the fourth image. In this case, the first offset amount 1501a to a fourth offset amount 1501d are prepared as the offset amount 301. The assumed size of the foreign substance adhering near the image capturing element or the aperture value of the image capturing optical system in image capturing determines the detailed offset amount. The detailed determination method will be described in detail together with the second embodiment. As described above, the first moving target amount 300a is updated incessantly even during capturing of one image while the offset amount 301 takes a fixed value during capturing of one image.

The camera shake correction lens 103 is driven on the basis of the calculated target value (second moving target amount 300b) containing the offset amount 301 (step S611). The image capturing sequence is executed while driving the camera shake correction lens 103. This image capturing sequence is different from that in step S605 described in FIG. 8 in step S701 to execute AF/AE. This will be described.

The image capturing sequence in step S605 adjusts the iris and sets the exposure time on the basis of the signal obtained from the AE sensor 207 to capture an image with an appropriate exposure amount. The image capturing sequence in step S611, however, adjusts the iris and sets the exposure time on the basis of the number n of acquired images. That is, n acquired image data are finally going to form one composited image data. It is therefore preferable to acquire each image data with an underexposure amount rather than with an appropriate exposure amount. Image capturing with an underexposure amount can use a higher shutter speed as compared to an appropriate exposure amount and is therefore advantageous for camera shake, object movement, and random noise. Assume that the number n of acquired images is four. In this case, the shutter speed can be ¼ that with an appropriate exposure amount if the ISO sensitivity and aperture value are the same. Hence, in the image capturing sequence in step S611, the aperture value and exposure time are set in accordance with the number n of acquired images in step S701.

In step S612, after the series of processes in FIG. 8, the current number i of captured images is incremented by one (i=i+1).

The process advances to step S613 to determine whether the current number i of captured images has reached the number n of acquired images. If i≠n, i.e., if the user has not done image capturing to acquire the scheduled number of image yet, the process returns to step S610.

In step S610, the user captures the ith image by using the offset amount 301 updated to the ith offset amount corresponding to the incremented current number i of captured images (steps S610 to S612). The user repeatedly captures the image of the same object in this way.

If it is determined in step S613 that the current number i of captured images has reached the number n of acquired images, the process advances to step S614. In step S614, a foreign substance correction process and an image composition process are executed. The foreign substance correction process and image composition process ("foreign substance correction process & image composition process" in FIG. 7) will be described with reference to FIG. 9.

Figure 9:
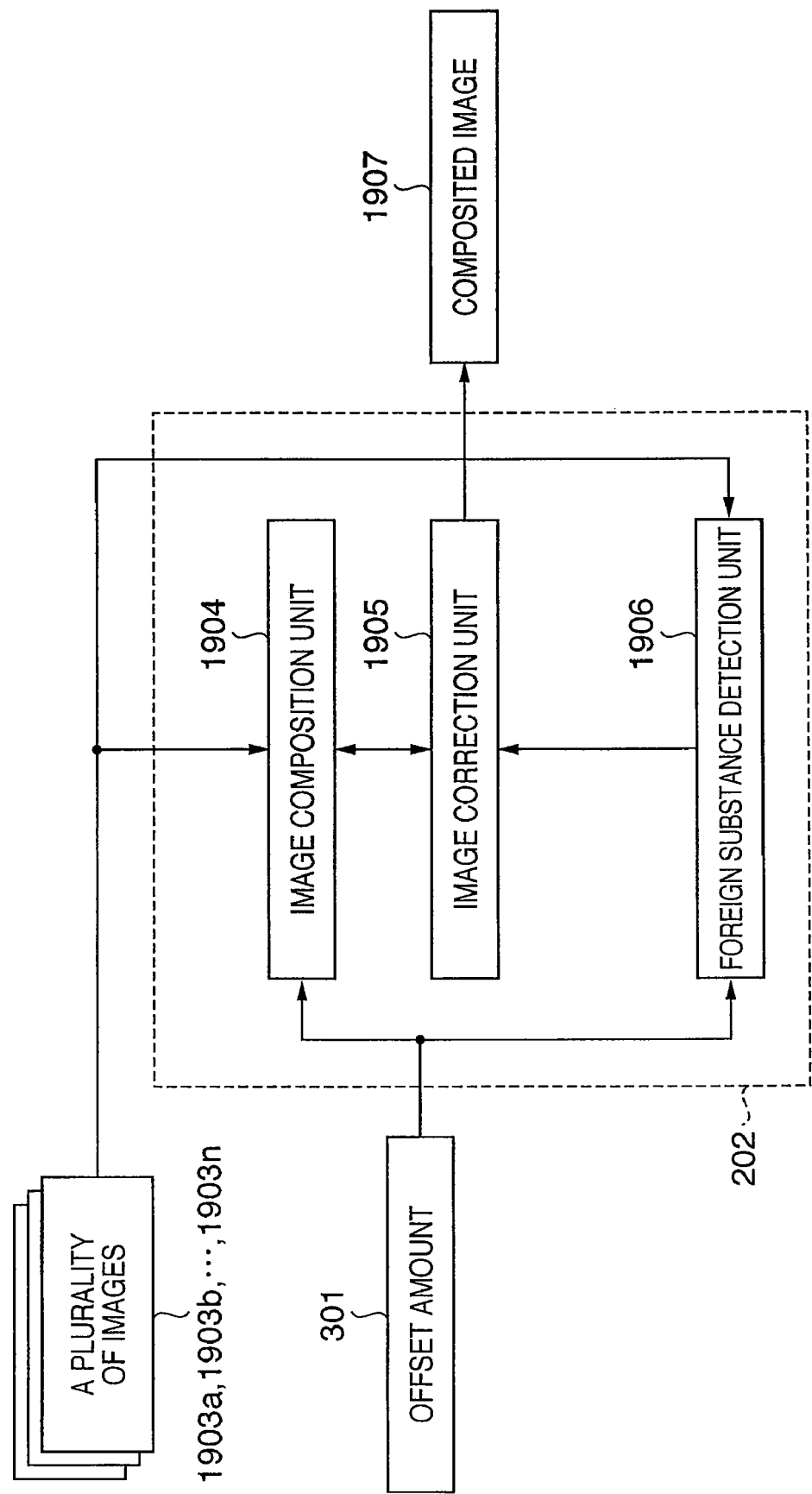
FIG. 9 is a block diagram showing the data flow of an image processing method.

FIG. 9 is a block diagram showing the data flow of processes of detecting a foreign substance from acquired image data and executing image composition. An image composition unit 1904 in the image processing circuit 202 receives, from the memory 107, a plurality of images 1903a, 1903b, ..., 1903n captured while updating the offset amount 301. The image composition unit 1904 and a foreign substance detection unit 1906 in the image processing circuit 202 receive the offset amounts 301 corresponding to the plurality of images. The offset amounts 301 are the first offset amount 1501a to an nth offset amount 1501n corresponding to the plurality of images, respectively. The image composition unit 1904 composites the plurality of images into one image by aligning them on the basis of the offset amounts 301 and adjusting the exposure amount of the images. In this composition process, a correction process is done by parallelly executing foreign substance detection to be described below.

The foreign substance detection unit 1906 detects foreign substance area information containing the position and size of a foreign substance from the plurality of images by a known method while referring to the offset amounts 301. Especially in this embodiment, the offset amounts 301 exist together with the plurality of images obtained by continuously capturing the same object. It is therefore possible to detect a foreign substance more accurately.

If a foreign substance adheres to the surface of an optical element near the image capturing element and, for example, the surface of the cover glass, optical low-pass filter, or infrared cut filter of the image capturing element, the captured images continuously contain the shadow of the foreign substance. At this time, the foreign substance adhering position is stationary relative to the pixels of the image capturing element 106. That is, the shadow of the foreign substance always falls on predetermined pixels. On the other hand, the object image shifts with respect to the pixels of the image capturing element 106 in every image capturing as the camera shake correction lens 103 is driven in consideration of a predetermined offset amount. Hence, if a plurality of images of a single object are acquired while changing the offset amount in every image capturing, the relative position between the object and the shadow of the foreign substance changes between the captured images of the acquired image signals.

On the basis of the effective pixel area of the image capturing element 106, even the pieces of foreign substance area information detected from the second, third, and subsequent captured images indicate the same position and size as those indicated by the foreign substance area information containing the position and size of the foreign substance detected from the first captured image. The first, second, and subsequent object images shift relative to each other.

Conversely, on the basis of the object images i.e., if the object images are aligned and composited while referring to the offset amounts, as described above, the shadow of the foreign substance is displaced relative to each other between the captured images. That is, the object image that should exist behind the shadow of the foreign substance in the first image appears in the second and third images without being hidden.

When the image composition unit 1904 composites the n captured images, an image correction unit 1905 executes correction on the basis of the foreign substance area information detected by the foreign substance detection unit 1906. More specifically, the image correction unit 1905 does not use for composition the area including the shadow of the foreign substance detected by the foreign substance detection unit 1906 from each captured image. Assume that the offset amount is sufficiently large with respect to the size of a certain foreign substance. In this case, an area that does not overlap the foreign substance shadow area in the n captured images that are superimposed and an area that overlaps the foreign substance shadow area in one of the n captured images are generated. Composition is done without using the image including the area that overlaps the foreign substance shadow area and therefore exists behind it. For this reason, composition of the remaining (n−1) images is done while amplifying the area that does not overlap the foreign substance shadow to n/(n−1) times.

If a plurality of adhering foreign substances are present, different foreign substances may be present within a single object part in the plurality of images aligned on the basis of the offset amounts 301. In this case, a plurality of images are unusable for composition of the n images. When k images are unusable, composition is done while amplifying the area that does not overlap the foreign substance shadow to n/(n−k) times.

When n images of a single object are composited with a predetermined offset amount, it is impossible to superimpose the peripheral areas of the n images. Such areas undergo trimming in the composition process. The area in which n images superimpose on each other is extracted as a rectangular area.

Alignment is necessary in compositing a plurality of captured images. The alignment is done on the basis of the offset amount 301, as described above. To simultaneously execute camera shake correction, a shift caused by the correction amount remains without returning the camera shake correction lens 103 to the center of the optical axis in every image capturing. Hence, it is preferable to increase the alignment accuracy by using not only the offset amount but also a known pattern matching technique. The memory 107 stores the image file generated by foreign substance detection, image composition, and image correction as a composited image 1907 without the shadow of the foreign substance.

Referring back to FIG. 7, when the foreign substance correction process and composition process in step S614 finish, the series of image capturing processes finishes, and the process advances to step S606 to prepare for image capturing.

Figure 10A:
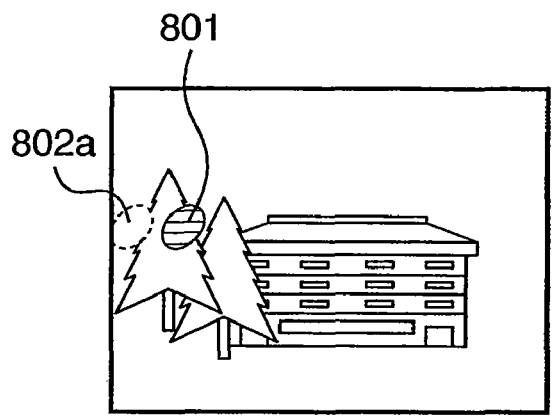
FIGS. 10A to 10C are views showing two captured images before image composition and an image obtained by superimposing them.
Figure 10B:
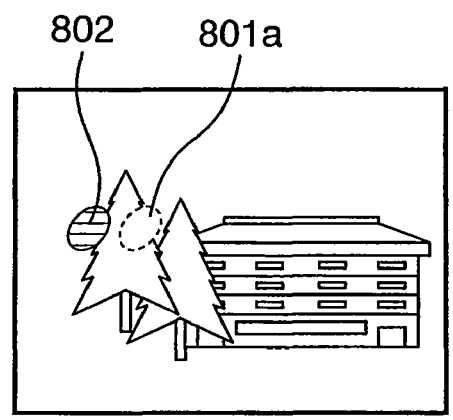
Figure 10C:
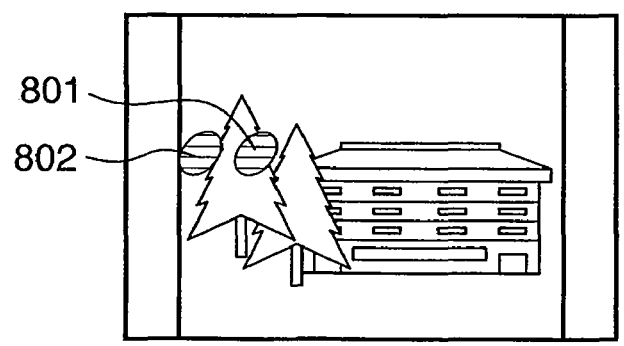

The process described with reference to FIG. 9 will be described in more detail by using schematic views. FIGS. 10A to 10C show two captured images before image composition and an image obtained by superimposing them. FIGS. 10A and 10B are schematic views of two captured images obtained by changing the offset amount 301 of the camera shake correction mechanism. Assume that the number n of images to be composited (acquired images) is 2, for the descriptive convenience. More specifically, the offset amount 1501a is provided to shift the object image to the left upon capturing the first image. The offset amount 1501b is provided to shift the object image to the right upon capturing the second image. As shown in FIGS. 10A and 10B, the object images are formed at different positions on the image capturing element 106. Each of areas 801 and 802 includes an image part lost by a foreign substance, i.e., an image part placed in the shadow of a foreign substance. The foreign substance adheres near the image capturing element 106. For this reason, the shadow of the foreign substance always falls on predetermined pixels. The outer frames of FIGS. 10A and 10B indicate the effective pixel area of the image capturing element 106. The positions of the areas 801 and 802 do not change with respect to the outer frame. That is, the shadow areas match between FIGS. 10A and 10B, and the object images relative to each other on the basis of the effective pixel area. FIG. 10C shows the images superimposed on the basis of the object images. More specifically, when the sum of the provided offset amounts 1501a and 1501b is converted into an amount on the image capturing element, the resultant value almost equals the relative shift of the object images in the two images. Hence, for example, when the image in FIG. 10B shifts relative to the image in FIG. 10A by an amount equal to the converted sum, the object images almost match. Then, the shadow areas in the images shift relative to each other (801 and 802 in FIG. 10C). At this time, on the basis of the object images, an area 801a in FIG. 10B corresponding to the shadow area 801 of the first image in FIG. 10A has the information of the object image without being hidden by the foreign substance. Similarly, an area 802a in FIG. 10A corresponding to the shadow area 802 of the second image in FIG. 10B has the object image without being hidden by the foreign substance. In compositing the images in FIGS. 10A and 10B, corresponding pixels are added in FIG. 10C except the areas 801 and 802. In the area 801, the pixels in the area 801a in FIG. 10B are amplified to twice, and the pixel information in the area 801 in FIG. 10A is not used. Similarly, in the area 802, the pixels in the area 802a in FIG. 10A are amplified to twice, and the pixel information in the area 802 in FIG. 10B is not used. In FIG. 10C, no superimposition takes place at the two ends due to the shift. This area is cut. In this way, an object image without the shadow of the foreign substance can be obtained.

In this embodiment, since the plurality of images are obtained in a short time during image capturing, the two images are almost the same. This avoids the conventional problem that correction is impossible if a foreign substance enters in the interval between cleaning in the cleaning mode and image capturing. Additionally, the user need not prepare, e.g., a uniform paper sheet to acquire a reference image, resulting in improvement of user convenience.

This embodiment has exemplified composition of a plurality of images in the image capturing apparatus. The image capturing apparatus side may only acquire a plurality of captured images, and an image processing apparatus outside the image capturing apparatus may detect a foreign substance and composite the captured images. More specifically, an image processing apparatus such as a PC can receive a plurality of captured images and the information of the offset amount 301 from the image capturing apparatus via, e.g., a LAN or a detachable recording medium. In this way, an image processing apparatus outside the image capturing apparatus can detect a foreign substance and composite the images.

Figure 11:
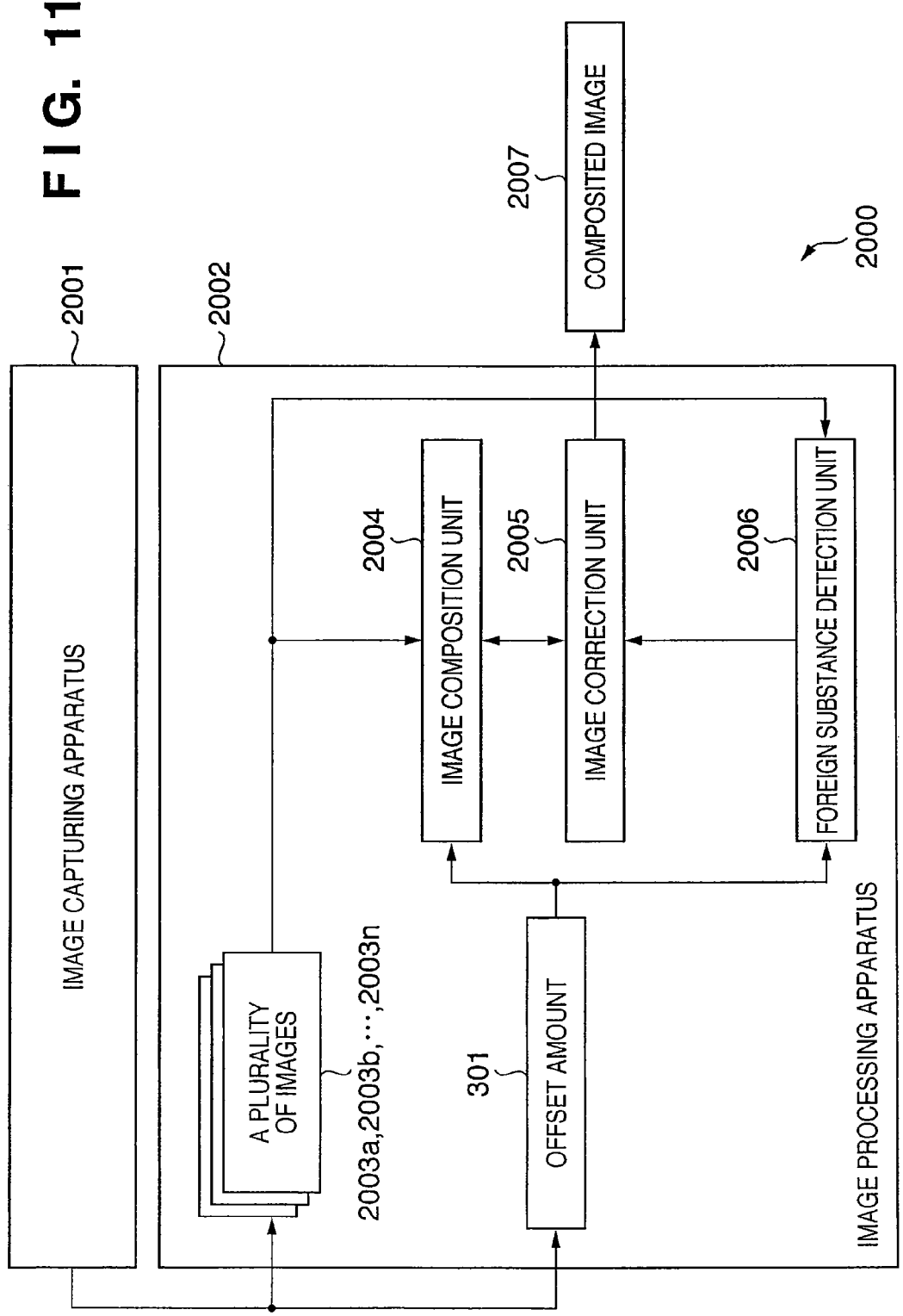
FIG. 11 is a block diagram showing the arrangement of an image capturing system.

FIG. 11 is a block diagram showing an image capturing system 2000. The image capturing system 2000 includes an image capturing apparatus 2001 according to the preferred embodiment of the present invention, and an image processing apparatus 2002. The image processing apparatus 2002 includes an image composition unit 2004, image correction unit 2005, and foreign substance detection unit 2006.

The image composition unit 2004 receives a plurality of captured images 2003a, 2003b, . . . , 2003n. The image composition unit 2004 is equivalent to the image composition unit 1904 in FIG. 9. The image composition unit 2004 aligns and composites the plurality of images into one image on the basis of the offset amounts 301 and adjusts the exposure amounts of the images. The foreign substance detection unit 2006 is equivalent to the foreign substance detection unit 1906 in FIG. 9. The foreign substance detection unit 2006 detects foreign substance area information containing the position and size of a foreign substance from the plurality of images while referring to the offset amounts 301. The image correction unit 2005 is equivalent to the image correction unit 1905 in FIG. 9. The image correction unit 2005 executes correction on the basis of the foreign substance area information detected by the foreign substance detection unit 2006 when the image composition unit 2004 composites the captured images. In this way, a composited image 2007 is generated by correcting the foreign substance area information. An external memory or HDD stores the generated composited image 2007.

When the image processing apparatus separated from the image capturing apparatus executes the process, the camera system control circuit 205 in the image capturing apparatus need not spare the process capability for the time-consuming image composition process and foreign substance detection process. This ensures an advantage of, e.g., preventing missing of any shutter opportunity.

Second Embodiment

Figure 12:
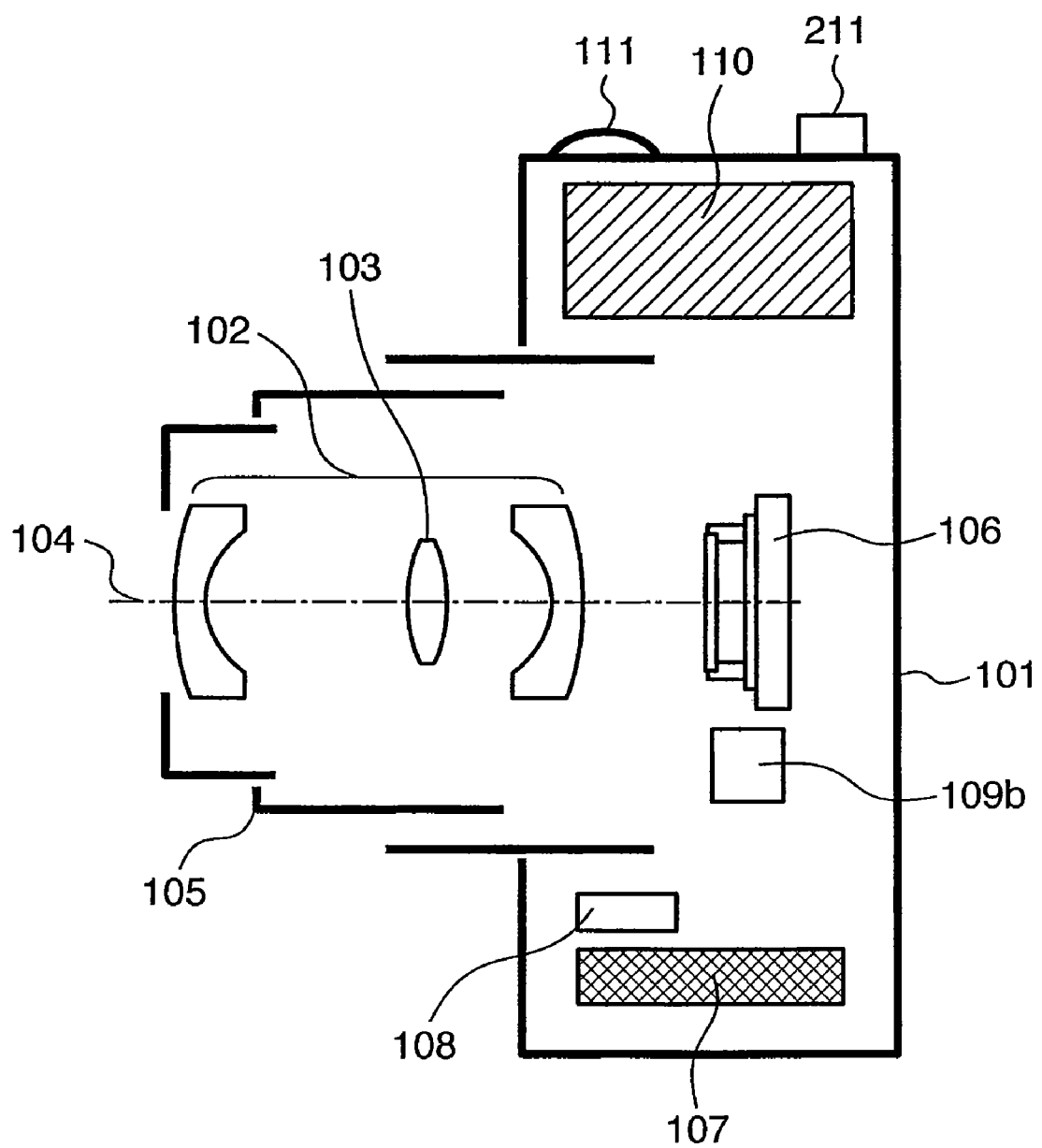
FIG. 12 is a sectional view of an image capturing apparatus according to the second embodiment.

FIGS. 12 to 15 show an image capturing apparatus according to the preferred second embodiment of the present invention. FIG. 12 is a sectional view showing an image capturing apparatus suitable to this embodiment. The same reference numerals as in the first embodiment denote the same constituent elements in FIG. 12. A difference from the first embodiment is that an image capturing element 106 itself moves (shifts) to correct a camera shake. For this purpose, the image capturing apparatus has a driving unit 109b for camera shake correction near an image capturing element 106. The driving unit 109b drives to shift the image capturing element 106. A switch 211 to set ON/OFF of the camera shake correction mode and ON/OFF of foreign substance correction exists on the side of an image capturing apparatus 101. The remaining components are the same as in the first embodiment.

Figure 13:
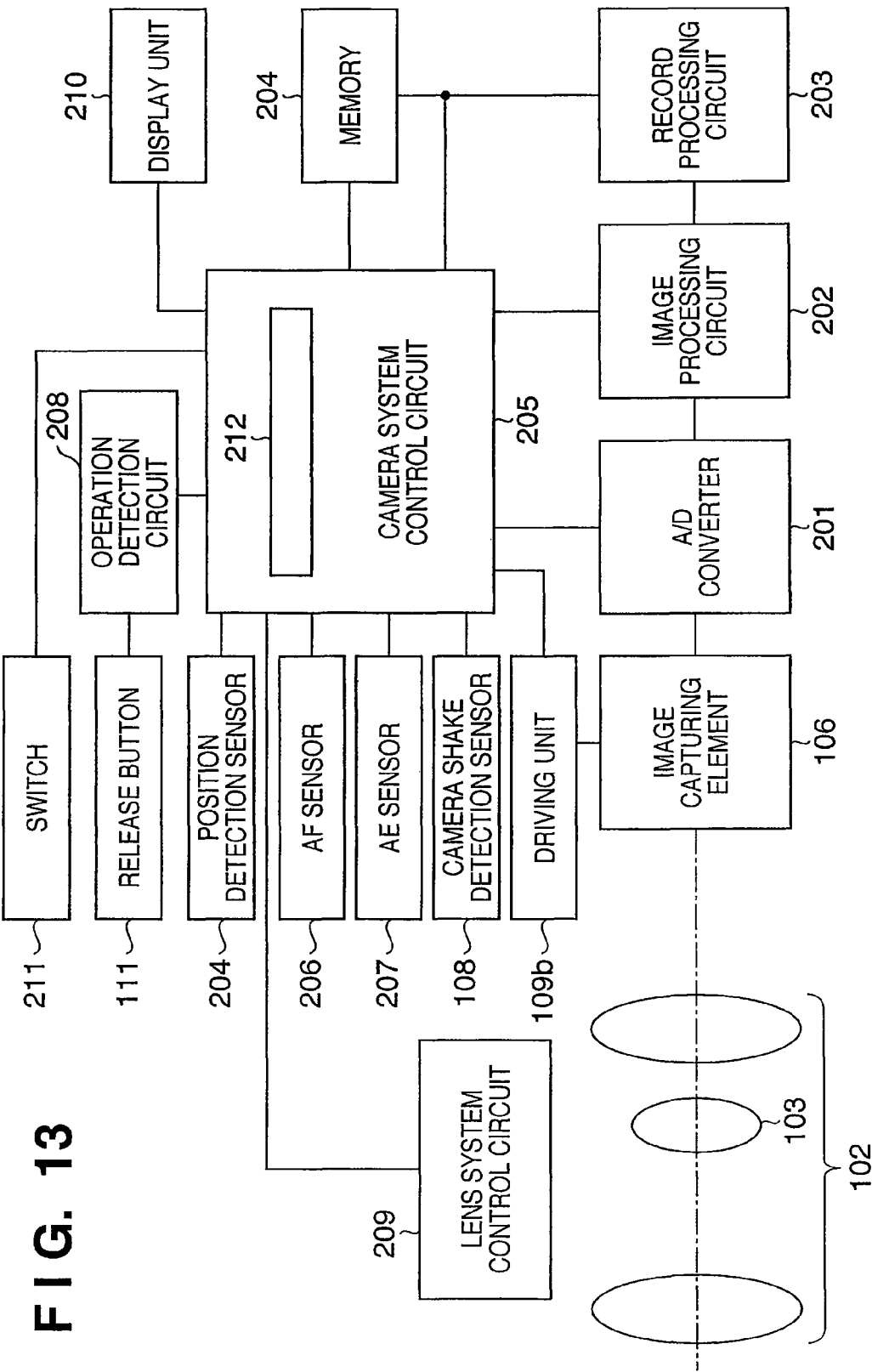
FIG. 13 is a block diagram showing the electrical arrangement of the image capturing apparatus according to the second embodiment.

FIG. 13 is a block diagram showing the electrical arrangement of the image capturing apparatus according to this embodiment. The same reference numerals as in the first embodiment denote the same constituent elements in FIG. 13. A difference from the first embodiment is that the driving unit 109b for driving to shift the image capturing element 106 serves as a driving unit configured to correct a camera shake, instead of causing a camera system control circuit 205 to include the driving unit. The image capturing process is the same as in the first embodiment.

Figure 14:
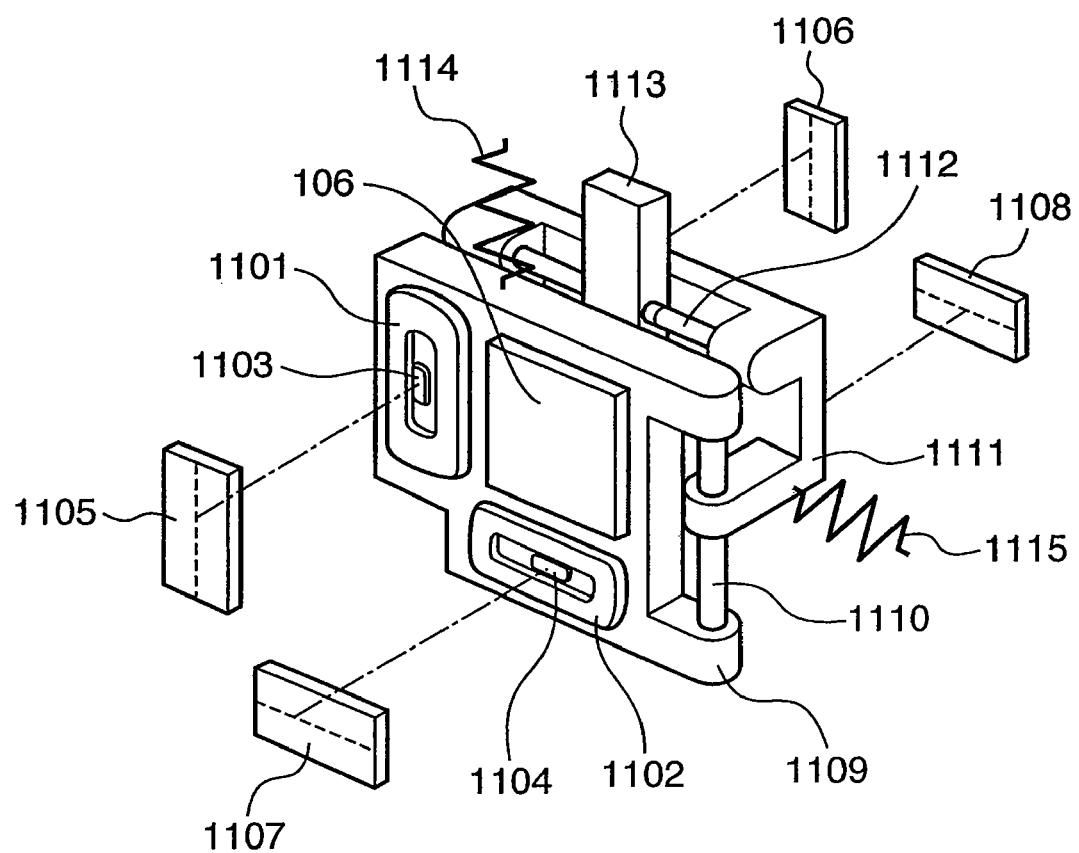
FIG. 14 is a perspective view showing an example of a camera shake correction mechanism according to the second embodiment.
Figure 15:
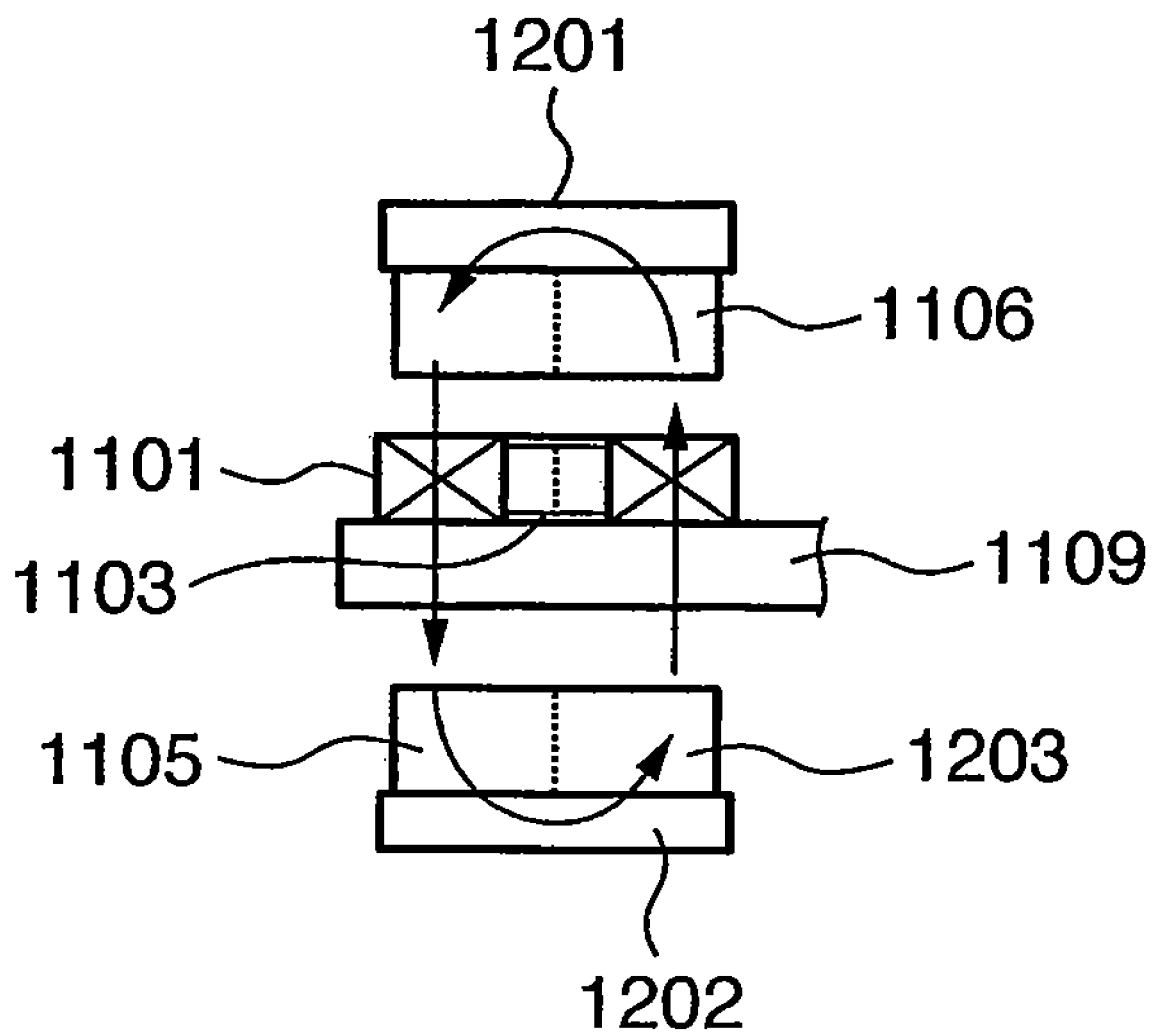
FIG. 15 is a view showing the driving force generation unit of the camera shake correction mechanism according to the second embodiment.

FIGS. 14 and 15 show an example of the mechanism for shift-driving the image capturing element 106. Referring to FIG. 14, the apparatus includes the image capturing element 106. Reference numerals 1101 and 1102 denote driving coils; 1103 and 1104, Hall elements to detect the position of the movable unit; 1105, 1106, 1107, and 1108, magnets; 1109, a first holding unit; 1110, a first guide unit provided on the first holding unit 1109; 1111, a second holding unit; 1112, a second guide unit provided on the second holding unit 1111; 1113, a third holding unit fixed to the lens barrel; 1114, a first elastic body provided between the first holding unit 1109 and a fixed unit (not shown); and 1115, a second elastic body provided between the second holding unit 1111 and a fixed unit (not shown). The guide direction of the first guide unit 1110 is perpendicular to that of the second guide unit 1112. The first elastic body 1114 and second elastic body 1115 elastically support the first holding unit 1109 having the image capturing element 106.

FIG. 15 is a view showing the arrangement of the driving unit. There are two magnetic circuits having identical arrangements with an angular difference of 90°. An explanation will be made by exemplifying the driving unit including the driving coil 1101 and the magnets 1105 and 1106. Referring to FIG. 15, an arrow 1203 indicates a magnetic flux. FIG. 14 does not illustrate yokes 1201 and 1202. The magnets 1105 and 1106 are divided into two regions and magnetized. For this reason, as shown in FIG. 15, most magnetic fluxes form the closed magnetic path 1203 that circulates by using the yokes 1201 and 1202 on the back sides. When a current flows to the driving coil 1101, a force is generated in the driving coil 1101 by the Fleming's left hand rule. When the generated force and the first elastic body 1114 and second elastic body 1115 balance, the first holding unit 1109 and image capturing element 106 are displaced. When the first holding unit 1109 is displaced, the Hall elements 1103 and 1104 provided on it are also displaced. Consequently, a displacement relative to the magnetic circuit provided in the fixed unit takes place. This makes it possible to detect the position of the first holding unit 1109 from signals from the Hall elements 1103 and 1104 and execute feedback control. It is also possible during exposure to obtain a shake-free high-quality image by appropriately controlling the currents of the driving coils 1101 and 1102 on the basis of lens information and a signal from a camera shake detection sensor 108.

The camera shake correction system control block has the same arrangement as in the first embodiment shown in FIG. 3 except that the driving target is not a camera shake correction lens 103 but the image capturing element 106. Referring to FIG. 3, the camera system control circuit 205 appropriately sets an offset amount 301, as will be described later.

The procedure of image capturing is the same as in the first embodiment shown in FIGS. 7 and 8. A method of setting the offset amount 301 will be described here with reference to FIGS. 16A and 16B and Table 1.

Figure 16B:
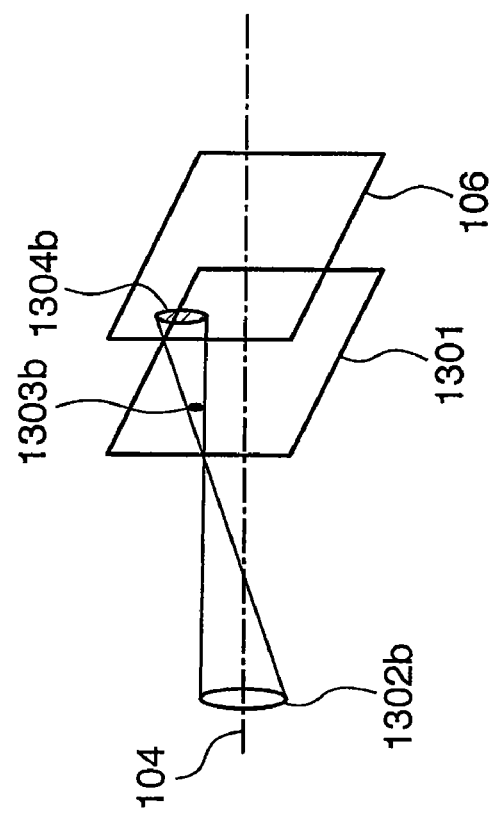
FIGS. 16A and 16B are schematic views showing areas influenced by a foreign substance in the second embodiment.
Figure 16A:
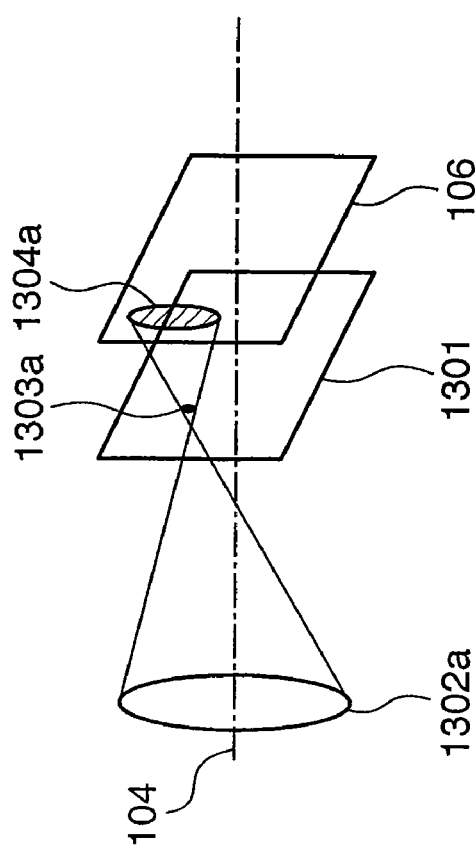

Referring to FIGS. 16A and 16B, a foreign substance adheres to an optical element 1301 such as the cover glass, optical low-pass filter, or infrared cut filter of the image capturing element. An image capturing optical system 102 shown in FIG. 12 has exit pupils 1302a and 1302b. Foreign substances 1303a and 1303b adhere to the surface of the optical element 1301. The foreign substances 1303a and 1303b influence areas 1304a and 1304b on the image capturing element 106. That is, the areas 1304a and 1304b are shadow areas formed by the foreign substances. FIG. 16A shows a state wherein the iris of the image capturing optical system 102 is open. FIG. 16B shows a state wherein the iris of the image capturing optical system 102 is stopped down by a predetermined amount. As is apparent from FIGS. 16A and 16B, the outer diameters of the foreign substances 1303a and 1303b, the aperture value (F-number) of the image capturing optical system 102, and the distance between the image capturing element 106 and the optical element 1301 determine the areas 1304a and 1304b influenced by the foreign substances 1303a and 1303b on the image capturing element 106. Let r be the outer diameter of the foreign substances 1303a and 1303b, $F_{n0}$ be the aperture value of the image capturing optical system 102, and l be the distance between the image capturing element 106 and the optical element 1301. A value obtained by adding an amount inversely proportional to the aperture value to the outer diameter r represents the areas 1304a and 1304b. Generally, the diameter of the areas 1304a and 1304b is given by $$r + l/F_{n0} \qquad \text{Equation (1)}$$

Consider the foreign substances 1303a and 1303b adhering to the optical element 1301. A Coulomb's force, liquid crosslinking force, or van der Waals' force supposedly acts between the optical element 1301 and the foreign substances 1303a and 1303b. However, a large foreign substance should drop because the force of gravity is larger than the above-described forces. The shapes of the foreign substances 1303a and 1303b, the surface shape of the optical element 1301, and the charge state between the optical element 1301 and the foreign substances 1303a and 1303b largely influence it. The optical element 1301 designed to suppress adhesion of foreign substances prevents adhesion of the foreign substances 1303a and 1303b more than 0.1 mm. Hence, the foreign substances 1303a and 1303b peel off from the optical element 1301 and drop due to the gravity. When r=0.1 mm, the maximum diameter of the foreign substances 1303a and 1303b can be defined as $0.1 + l/F_{n0}$. This value is unique to the image capturing apparatus when the distance between the image capturing element 106 and the optical element 1301 is 1. $F_{n0}$ is a value arbitrarily set by the user or automatically set by the image capturing apparatus. $F_{n0}$ is kept constant in acquiring a series of a plurality of captured images and is therefore determined at the start of first image capturing.

As is apparent from the above-described relationship, when the offset amount 301 is set such that the shift amount between the object images is $0.1 + l/F_{n0}$ or more, the foreign substance shadow areas in the plurality of captured images are prevented from overlapping each other. In acquiring, e.g., four captured images, the image capturing element 106 is driven to shift in a diagonal-left-down, diagonal-left-up, diagonal-right-down, and diagonal-right-up directions. In this case, offset amounts 1501a, 1501b, 1501c, and 1501d are given as in Table 1.

TABLE 1

| | Offset Amounts of Axes | |
|---|---|---|
| | X | Y |
| Offset amount 1501a of first image | $-0.05 - \dfrac{1}{2 \times F_{n0}}$ | $-0.05 - \dfrac{1}{2 \times F_{n0}}$ |
| Offset amount 1501b of second image | $-0.05 - \dfrac{1}{2 \times F_{n0}}$ | $0.05 + \dfrac{1}{2 \times F_{n0}}$ |
| Offset amount 1501c of third image | $0.05 + \dfrac{1}{2 \times F_{n0}}$ | $-0.05 - \dfrac{1}{2 \times F_{n0}}$ |
| Offset amount 1501d of fourth image | $0.05 + \dfrac{1}{2 \times F_{n0}}$ | $0.05 + \dfrac{1}{2 \times F_{n0}}$ |

Figure 17A:
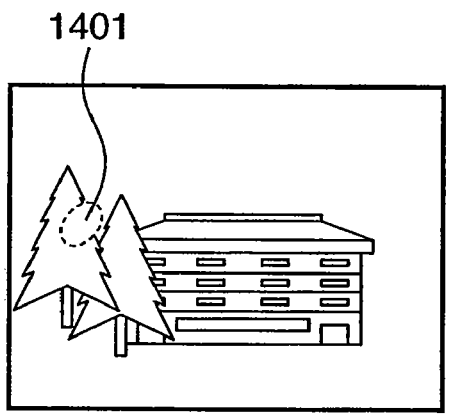
FIGS. 17A to 17E are views showing four captured images before image composition and an image obtained by superimposing them.
Figure 17B:
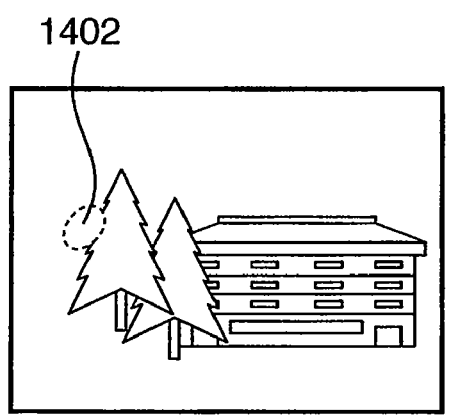
Figure 17C:
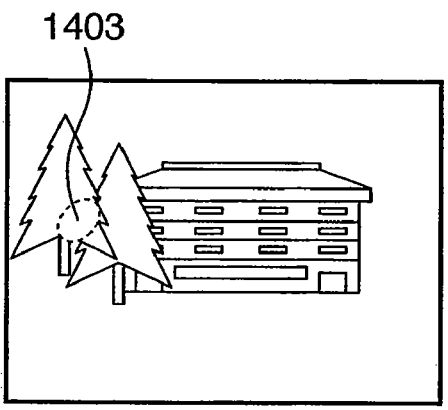
Figure 17D:
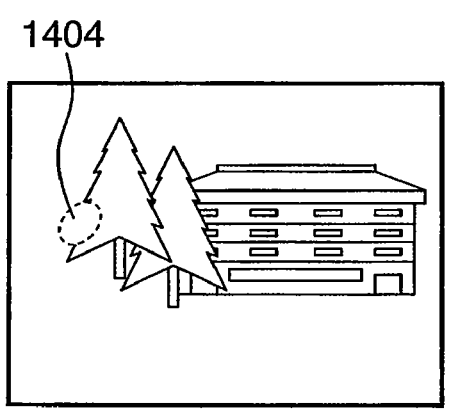
Figure 17E:
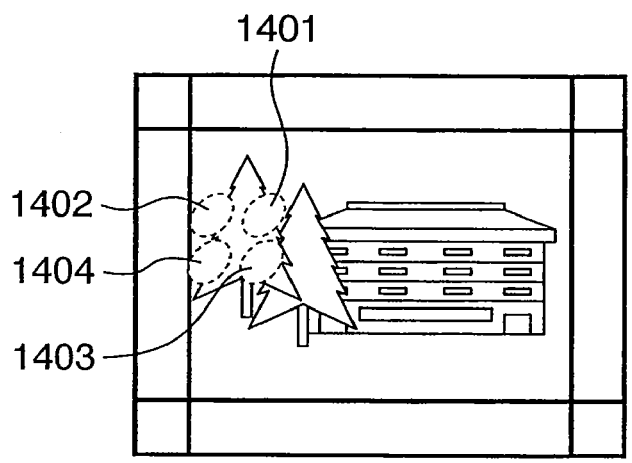

FIGS. 17A to 17E show examples of four images acquired in accordance with Table 1. Referring to FIGS. 17A to 17D, reference numerals 1401 to 1404 denote foreign substance shadow areas in the images. FIG. 17E shows an image obtained by aligning and superimposing the four images. As is apparent from FIG. 17E, the foreign substance shadow areas formed in the captured images do not overlap. Hence, for example, the object image area hidden by the area 1401 in FIG. 17A is superimposed while amplifying the same area in the remaining three images to 4/3 times. At this time, the area 1401 in FIG. 17A is not used for superimposition. For the areas 1402 to 1404 as well, the remaining three images are superimposed. The peripheral area shown in FIG. 17E where the four images do not overlap is cut off by trimming. In this way, an object image without the shadow of the foreign substance can be obtained by the correction process.

When the appropriate offset amount 301 is set, it is unnecessary to shift the object image more than necessity so that it is possible to suppress power consumption by driving of the control target. In this embodiment, four captured images are acquired on the basis of four offset amounts 301b. The number of acquired images is not particularly limited since it is necessary to acquire at least two captured images.

In this embodiment, the object image is shifted while starting offset amount setting from the first image. However, for example, the offset amount of the first image or several images may be 0. At this time, the offset amount 301 is set to make the object image interval $0.1+1/F_{n0}$ or more, as described above, upon acquiring other captured images such that the foreign substance shadows do not overlap in the superimposed captured images.

The method described in the second embodiment is also applicable to the first embodiment. In the second embodiment, to drive and shift the image capturing element 106, the offset amount is calculated by conversion based on the formed object image, as described with reference to FIGS. 16A and 16B. In the first embodiment that drives the camera shake correction lens 103, the offset amount of the camera shake correction lens 103 is calculated such that it becomes $1+1/F_{n0}$ or more on the image capturing element 106.

In both of the first and second embodiments, a plurality of captured images are acquired by setting an offset amount while correcting the camera shake, as shown in the flowchart of FIG. 7. However, the present invention is not limited to this. If the shutter speed is high to some extent (e.g., higher than 1/(focal length of image capturing optical system 102) sec) in acquiring the plurality of captured images, a camera shake rarely occurs in the exposure time, and camera shake correction is unnecessary. At this time, the driving unit 109a drives on the basis of only the offset amount 301 without considering the first moving target amount 300a calculated by the calculation unit 212.

The objects of the embodiments are also achieved by the following method. A storage medium which records software program codes to implement the functions of the above-described embodiments is supplied to a system or apparatus. The computer (or CPU or MPU) of the system or apparatus reads out and executes the program codes stored in the storage medium. In this case, the program codes read out from the storage medium themselves implement the functions of the above-described embodiments. The storage medium that stores the program codes constitutes the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-156646, filed Jun. 5, 2006, which is hereby incorporated by reference herein in its entirety.

What is claimed is:

1. An image capturing apparatus comprising:
an image capturing unit configured to photoelectrically convert an object image formed by an image capturing optical system;
a moving unit configured to move the object image relative to the image capturing unit;
a camera shake detection unit configured to detect a camera shake;
a calculation unit configured to calculate a moving amount of the moving unit to cancel the movement of the object image on the basis of an output from the camera shake detection unit;
a driving unit configured to drive the moving unit based on the moving amount calculated by the calculation unit; and
a control unit configured to acquire a plurality of captured images while moving said moving unit by said driving unit by adding a predetermined offset amount to the moving amount;
a foreign substance detection unit configured to detect foreign substance area information including at least position information about a foreign substance adhered near said image capturing unit by comparing the plurality of captured images based on the offset amount;
an image correction unit configured to correct the foreign substance area in the plurality of captured images based on a detection result of said foreign substance detection unit and the offset amount; and
an image composition unit configured to composite the plurality of captured images based on the offset amount and the moving amount.

2. The apparatus according to claim 1, wherein the offset amount is determined in accordance with an aperture value of the image capturing optical system.

3. The apparatus according to claim 1, wherein the moving unit moves the object image by driving part of the image capturing optical system.

4. The apparatus according to claim 1, wherein the offset amount includes 0.

5. The apparatus according to claim 1, wherein
said image correction unit corrects a partial area containing a shadow of the foreign substance in a first captured image as one of the plurality of captured images by using a partial area containing no shadow of the foreign substance in another captured image different from the first captured image of the plurality of captured images on the basis of the offset amount and the foreign substance area information.

6. An image capturing system comprising:
an image capturing apparatus including:
an image capturing unit configured to photoelectrically convert an object image formed by an image capturing optical system;
a moving unit configured to move the object image relative to the image capturing unit;
a camera shake detection unit configured to detect a camera shake;
a calculation unit configured to calculate a moving amount of the moving unit to cancel the movement of the object image on the basis of an output from the camera shake detection unit;
a driving unit configured to drive the moving unit based on the moving amount calculated by the calculation unit; and
a control unit configured to acquire a plurality of captured images while moving said moving unit and performing a camera shake correction by said driving unit by adding a predetermined offset amount to the moving amount, and
an image processing apparatus including:
an acquisition unit configured to acquire the plurality of captured images acquired in the image capturing apparatus, and said predetermined offset amount provided to the moving unit in obtaining the plurality of captured images in the image capturing apparatus;
a foreign substance detection unit configured to detect foreign substance area information including at least position information about a foreign substance adhering near the image capturing unit by comparing the plurality of captured images;

an image correction unit configured to correct a partial area containing a shadow of the foreign substance in a first captured image as one of the plurality of captured images by using a partial area containing no shadow of the foreign substance in another captured image different from the first captured image of the plurality of captured images on the basis of the offset amount and the foreign substance area information; and an image composition unit configured to composite the plurality of captured images on the basis of the offset amount and the moving amount.

7. A method of controlling an image capturing apparatus including an image capturing unit configured to photoelectrically convert an object image formed by an image capturing optical system, a moving unit configured to move the object image relative to the image capturing unit, and a camera shake detection unit configured to detect a camera shake, comprising the steps of:

calculating a moving amount of the moving unit to cancel the movement of the object image on the basis of an output from the camera shake detection unit;

driving the moving unit based on the calculated moving amount;

acquiring a plurality of captured images while moving said moving unit by said driving step by adding a predetermined offset amount to the moving amount;

detecting foreign substance area information including at least position information about a foreign substance adhered near said image capturing unit by comparing the plurality of captured images based on the offset amount;

correcting the foreign substance area in the plurality of captured images based on a detection result of said detecting step and the offset amount; and compositing the plurality of captured images based on the offset amount and the moving amount.

8. A computer program stored on a non-transitory readable medium, which causes a computer to execute a control method of claim 7.

9. An image capturing apparatus comprising:

an image capturing unit configured to photoelectrically convert an object image formed by an image capturing optical system;

a moving unit configured to move the object image relative to the image capturing unit;

a camera shake detection unit configured to detect a camera shake;

a calculation unit configured to calculate a moving amount of the moving unit to cancel the movement of the object image on the basis of an output from the camera shake detection unit;

a driving unit configured to drive the moving unit based on the moving amount calculated by the calculation unit; and a control unit configured to acquire a plurality of captured images while moving said moving unit by said driving unit by adding a predetermined offset amount to the moving amount;

a foreign substance detection unit configured to detect foreign substance area information including at least position information about a foreign substance adhered near said image capturing unit by comparing the plurality of captured images based on the offset amount; and an image processing unit configured to generate an image in which the foreign substance area is corrected from the plurality of captured images based on a detection result of said foreign substance detection unit and the offset amount, by compositing the plurality of captured images based on the offset amount and the moving amount.

10. The apparatus according to claim 9, wherein the offset amount is determined in accordance with an aperture value of the image capturing optical system.

11. The apparatus according to claim 9, wherein the moving unit moves the object image by driving part of the image capturing optical system.

12. The apparatus according to claim 9, wherein the offset amount includes 0.

13. The apparatus according to claim 9, wherein said image processing unit corrects a partial area containing a shadow of the foreign substance in a first captured image as one of the plurality of captured images by using a partial area containing no shadow of the foreign substance in another captured image different from the first captured image of the plurality of captured images on the basis of the offset amount and the foreign substance area information.

14. An image capturing system comprising:

an image capturing apparatus including:

an image capturing unit configured to photoelectrically convert an object image formed by an image capturing optical system;

a moving unit configured to move the object image relative to the image capturing unit;

a camera shake detection unit configured to detect a camera shake;

a calculation unit configured to calculate a moving amount of the moving unit to cancel the movement of the object image on the basis of an output from the camera shake detection unit;

a driving unit configured to drive the moving unit based on the moving amount calculated by the calculation unit; and a control unit configured to acquire a plurality of captured images while moving said moving unit and performing a camera shake correction by said driving unit by adding a predetermined offset amount to the moving amount, and said predetermined image processing apparatus including:

an acquisition unit configured to acquire the plurality of captured images acquired in the image capturing apparatus, and an offset amount provided to the moving unit in obtaining the plurality of captured images in the image capturing apparatus;

a foreign substance detection unit configured to detect foreign substance area information including at least position information about a foreign substance adhering near the image capturing unit by comparing the plurality of captured images; and an image processing unit configured to generate an image in which the foreign substance area is corrected from the plurality of captured images based on a detection result of said foreign substance detection unit and the offset amount, by compositing the plurality of captured images based on the offset amount and the moving amount.

15. A method of controlling an image capturing apparatus including an image capturing unit configured to photoelectrically convert an object image formed by an image capturing optical system, a moving unit configured to move the object image relative to the image capturing unit, and a camera shake detection unit configured to detect a camera shake, comprising the steps of:

calculating a moving amount of the moving unit to cancel the movement of the object image on the basis of an output from the camera shake detection unit;

driving the moving unit based on the calculated moving amount;

acquiring a plurality of captured images while moving said moving unit by said driving step by adding a predetermined offset amount, which is different in every image capturing, to the moving amount;

detecting foreign substance area information including at least position information about a foreign substance adhered near said image capturing unit by comparing the plurality of captured images based on the offset amount; and generating an image in which the foreign substance area is corrected from the plurality of captured images based on a detection result of said foreign substance detection unit and the offset amount, by compositing the plurality of captured images based on the offset amount and the moving amount.

16. A computer program stored on a non-transitory readable medium, which causes a computer to execute a control method of claim 15.

* * * * *